(12) United States Patent
Taniguchi et al.

(10) Patent No.: US 8,257,590 B2
(45) Date of Patent: Sep. 4, 2012

(54) HOLLOW FIBER MEMBRANE MODULE, PROCESS FOR MANUFACTURING THE SAME, HOLLOW FIBER MEMBRANE MODULE ASSEMBLY AND METHOD OF PURIFYING SUSPENDED WATER WITH USE THEREOF

(75) Inventors: Tohru Taniguchi, Tokyo (JP); Yuzuru Ishibashi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 112 days.

(21) Appl. No.: 12/601,065

(22) PCT Filed: May 21, 2008

(86) PCT No.: PCT/JP2008/059366
§ 371 (c)(1),
(2), (4) Date: Nov. 20, 2009

(87) PCT Pub. No.: WO2008/143292
PCT Pub. Date: Nov. 27, 2008

(65) Prior Publication Data
US 2010/0155334 A1    Jun. 24, 2010

(30) Foreign Application Priority Data

May 22, 2007  (JP) ................................. 2007-134951

(51) Int. Cl.
*B01D 63/00* (2006.01)
*F22D 1/28* (2006.01)
*F01M 9/127* (2006.01)

(52) U.S. Cl. ........... 210/321.8; 210/321.87; 210/321.89; 210/321.69; 261/2; 261/19; 261/20; 261/66

(58) Field of Classification Search .................. 210/636, 210/321.8, 321.6, 321.69, 321.79, 321.87, 210/321.89, 257.2; 261/2, 19, 20, 66
See application file for complete search history.

(56) References Cited

U.S. PATENT DOCUMENTS 4,876,006 A    10/1989  Ohkubo et al.
(Continued)

FOREIGN PATENT DOCUMENTS
EP    1310291    5/2003
(Continued)

OTHER PUBLICATIONS

Korea Office action, mail date is Mar. 28, 2011.
(Continued)

*Primary Examiner* — Ana Fortuna
(74) *Attorney, Agent, or Firm* — Greenblum & Bernstein, P.L.C.

(57) ABSTRACT

A hollow fiber membrane module characterized by having a tubular module case; a bundle of a multiplicity of hollow fiber membranes housed in the module case; adhesively fixing parts for fixing both side edge portions of the bundle in the module case in such a fashion that raw fluid can pass through the interior of the hollow fiber membranes; a permeated fluid communication part adapted for passable connection between both end faces outside the adhesively fixing parts by a pipe of diameter significantly larger than that of the hollow fiber membranes; and a raw fluid distribution supply part capable of feeding the raw fluid into the module case at one of the adhesively fixing parts, wherein the raw fluid distribution supply part has multiple raw fluid introduction holes made in hollow fiber membrane interspaces so as to be able to supply the raw fluid along the longitudinal direction of the hollow fiber membranes.

23 Claims, 23 Drawing Sheets

U.S. PATENT DOCUMENTS

| | | | |
|---|---|---|---|
| 5,209,852 A * | 5/1993 | Sunaoka et al. | 210/636 |
| 5,470,469 A * | 11/1995 | Eckman | 210/321.8 |
| 6,126,819 A * | 10/2000 | Heine et al. | 210/139 |
| 6,156,200 A | 12/2000 | Zha et al. | |
| 6,254,773 B1 | 7/2001 | Biltoft | |
| 6,331,248 B1 | 12/2001 | Taniguchi et al. | |
| 6,555,005 B1 * | 4/2003 | Zha et al. | 210/636 |
| 6,641,733 B2 * | 11/2003 | Zha et al. | 210/615 |
| 6,682,652 B2 * | 1/2004 | Mahendran et al. | 210/195.2 |
| 7,063,788 B2 * | 6/2006 | Mahendran et al. | 210/321.69 |
| 7,160,455 B2 * | 1/2007 | Taniguchi et al. | 210/321.88 |
| 7,537,701 B2 * | 5/2009 | Mahendran et al. | 210/650 |
| 2004/0045893 A1 | 3/2004 | Watanabe et al. | |
| 2009/0218274 A1 | 9/2009 | Sakashita et al. | |
| 2011/0100907 A1 * | 5/2011 | Zha et al. | 210/615 |

FOREIGN PATENT DOCUMENTS

| | | |
|---|---|---|
| JP | 53-035860 | 4/1978 |
| JP | 61-242607 | 10/1986 |
| JP | 63-111901 | 7/1988 |
| JP | 64-090005 | 4/1989 |
| JP | 3-119424 | 12/1991 |
| JP | 5-37327 | 5/1993 |
| JP | 6-218242 | 8/1994 |
| JP | 06-343837 * | 12/1994 |
| JP | 7-171354 | 7/1995 |
| JP | 7-185268 | 7/1995 |
| JP | 7-265671 | 10/1995 |
| JP | 9-220446 | 8/1997 |
| JP | 2002-336633 | 11/2002 |
| JP | 2005-34762 | 2/2005 |
| WO | 96/07471 | 3/1996 |
| WO | 98/25694 | 6/1998 |
| WO | 2007/063998 | 6/2007 |
| WO | 2009/076911 | 6/2009 |

OTHER PUBLICATIONS

International Search Report dated Aug. 26, 2008 that issued with respect to PCT/JP2008/059366.

International Preliminary Report on Patentability dated Nov. 22, 2009 that issued with respect to PCT/JP2008/059366.

Partial English language Translation of JP 63-111901, Jul. 19, 1988.

English language Abstract for JP 1090005 (corresponding to JP 64-090005, Apr. 5, 1989).

Partial English language Translation of JP 3-119424, Dec. 10, 1991.

Partial English language Translation of JP 5-37327, May 21, 1993.

* cited by examiner (1)

(2)

(1)

(2)

(3) F–F'

(4)

(1)

(2)

(3)

H-H'

(4)

(1)

71  72  73  74

(2)

(3)

(4)

# HOLLOW FIBER MEMBRANE MODULE, PROCESS FOR MANUFACTURING THE SAME, HOLLOW FIBER MEMBRANE MODULE ASSEMBLY AND METHOD OF PURIFYING SUSPENDED WATER WITH USE THEREOF

This application is a 371 of PCT/JP2008/059366, filed May 21, 2008, which claims priority of JAPAN 2007-134951 FILED ON May 22, 2007.

TECHNICAL FIELD

The present invention relates to an external-pressure type hollow fiber membrane that can be used in various fields but is particularly suitable for fields of water treatment such as clarification of river water, lake water, river-bed water, and the like. Moreover, the present invention relates to a hollow fiber membrane module having an increased effective length contributing to permeation through the hollow fiber membrane, the improved effective utilization factor of a membrane area, and enhanced permeation performance per unit area, and a process for manufacturing the hollow fiber membrane module, a hollow fiber membrane module assembly, and a method of purifying suspended water using the hollow fiber membrane module assembly.

BACKGROUND ART

Hollow fiber membrane modules can provide a large membrane area per unit volume. The hollow fiber membrane modules are thus applied in many fields of fluid treatment, for example, demineralization of brackish water and sea water using a reverse osmosis membrane, primary purification treatment of ultrapure water, removal of low molecular-weight organisms such as agricultural chemicals and polysaccharides using a nanofilter, concentration and demineralization of enzymes using a ultrafiltration membrane, manufacture of water for injection, recovery of electroplating coats, final filtration of ultrapure water, waste water treatment, clarification of river water, lake water, and river-bed water, purification, sterilization, and clarification of chemicals using a microfiltration membrane, and oxygen separation, nitrogen separation, hydrogen separation, and carbon dioxide gas separation using a gas separation membrane.

In recent years, in allowing river water, river-bed water, and the like to be used as purified water, hollow fiber membranes and hollow fiber membrane modules have been more widely used as a clarification method instead of coagulating sedimentation and sand filtration. Thus, new, high-performance hollow fiber membranes and hollow fiber membrane modules have been proposed.

Most conventional external pressure-type hollow fiber membrane modules pressurizing raw water via a hollow fiber membrane to obtain permeated water are constructed as follows. Hollow portions are sealed to an adhesive fixing portion positioned at the bottom of the module and partitioning hollow fiber membranes from a module housing in a liquid-tight manner. A plurality of raw water introduction holes are formed in the adhesive fixing portion so that raw water can be fed parallel to the hollow fiber membranes through the holes. Permeated water is sampled through the opening of each of the hollow fiber membranes in the end surface thereof located at the top of the module. Concentrated water containing suspended substances is discharged through a concentrated water discharge nozzle on a side surface of the upper portion of the module (See PATENT DOCUMENTS 1 and 2).

An example of the structure of such an external pressure-type hollow fiber membrane module is shown in FIG. 17. In FIG. 17, a large number (in this case, for simplification, three) hollow fiber membranes 105 are housed in a module case 104. At the top of the case, the hollow fiber membranes and the module case are adhesively fixed together in a liquid-tight manner by an adhesive fixing portion 106. The terminals of the hollow fiber membranes are open so as to enable a liquid to pass through. Permeated water is collected in a cap 101 and pumped upward through a permeated water sampling port 112 for sampling.

On the other hand, at the bottom of the case, the hollow fiber membranes are adhesively fixed to the module case in a liquid-tight manner by an adhesive fixing portion 107. The terminals of the hollow fiber membranes are closed. A plurality of raw-water introduction holes 108 are open in the lower adhesive fixing portion 107 so that any one of raw water, compressed air, and a mixed flow of raw water and compressed air can be fed through the holes 108. Here, a liquid flow during normal filtration will be described. Raw water flows from a raw-water supply port 110 formed in a lower cap 103, via the raw-water introduction holes 108 into the module case. Most of the raw water permeates the hollow fiber membranes 105. The resulting permeated water flows through the upper openings of the hollow fiber membranes via the cap 101 and sampled through the permeated water sampling port 112. Furthermore, part of the raw water is concentrated, and the concentrated water is discharged through a concentrated water discharge nozzle 111 on the side surface of the upper portion. At this time, depending on the quality of the raw water, a method can be adopted which discharges the concentrated water only during physical washing such as flushing, back washing, or aeration flushing rather than continuously discharging the concentrated water.

When miniaturized in order to evaluate the performance of the membranes or check for filtration stability, a hollow fiber membrane module constructed as described above may have an effective membrane length of about 1 m.

Furthermore, if the hollow fiber membrane module is used for an actual large-scale water clarification treatment, the effective length of the hollow fiber membranes is normally set to a larger value of about 2 m in order to reduce the installation area of an arrangement rack in which the membrane module is arranged or to increase the area of the hollow fiber membranes per unit volume. However, since the conventional hollow fiber membranes exhibit low permeation performance, a pressure drop in the hollow portion on the permeated water side is small. The conventional module is thus used without posing a problem in a practical sense.

However, recently, with an increase in the number of applications of membrane filtration modules for purified water, the permeation performance of the hollow fiber membranes has been improved. On the other hand, what is called one-sided water collection modules have frequently failed to offer a level of permeation performance otherwise exhibited by the hollow fiber membranes; in the one-sided water collection module, permeated water is sampled only through the openings of the hollow fiber membranes located at the top of the module.

Thus, a structure is known which has a module structure with a communication portion through which permeated water flows from one side to the other side in order to improve the effective utilization factor of the hollow fiber membranes; in this structure, permeated water can be sampled through the opposite ends of the hollow fiber membrane module (see, for example, PATENT DOCUMENTS 3 to 6). FIGS. 4, 5, and 9 in PATENT DOCUMENT 3 show that compressed air is introduced through a lower air introduction hole 19 to vibrate the hollow fiber membranes.

Such an introduction structure enables a fluid with a relatively low viscosity such as compressed air to be evenly distributed with a relatively low pressure drop. However, a viscous fluid such as water containing suspended substances results in a very heavy drop in the pressure required for a necessary supply. The mere feeding of the fluid into the hollow fiber membrane module requires at least 100 KPa. This supply pressure is equivalent to or higher than that required for the normal supply of raw water, that is, 50 to 100 KPa. Thus, it is unpractical to apply the structure with the introduction holes for air only to water without change.

Moreover, in a method for manufacturing the module structure, as described in PATENT DOCUMENT 4, a plurality of holes are formed along the outer circumference of the module case, and a partitioning plate with holes formed therein and a hollow fiber membrane bundle are housed in the module case at a time. Moreover, the holes in the partitioning plate are placed opposite the corresponding holes in the module case. The partitioning plate and the module case are adhesively fixed together using bolts with flexible tubes. Moreover, the bolts with the flexible tubes are removed. The method thus requires a very complicated assembly operation. It is thus difficult to apply the method to, for example, a membrane filtration process for river water which allows permeated water to be inexpensively obtained.

PATENT DOCUMENT 5 discloses a structure similar to those in PATENT DOCUMENTS 3 and 4. However, in this case, unless as seen in a sectional view, the air introduction holes are formed symmetrically with respect to a center axis and at equal intervals, the supply of air or water is not uniform. The symmetric arrangement at the equal intervals requires a complicated assembly operation as is the case with PATENT DOCUMENT 4.

Furthermore, PATENT DOCUMENT 6 discloses a structure in which a large number of raw water introduction holes extend from a site corresponding to a supply source pipe portion for raw water drilled from the substantial center of the outer end surface of one adhesive fixing portion, directly to the other adhesive fixing portion so as to allow raw water to be fed perpendicularly to the hollow fiber membranes. In this case, the raw water is fed perpendicularly outward from the center of the hollow fiber membrane bundle. Thus, disadvantageously, suspended substances are accumulated between the central hollow fiber membranes, preventing the raw water from being fed to the outer circumference of the bundle.

PATENT DOCUMENT 1: JP-A-07-171354
PATENT DOCUMENT 2: JP-A-09-220446
PATENT DOCUMENT 3: JP-U-63-111901
PATENT DOCUMENT 4: JP-A-64-090005
PATENT DOCUMENT 5: JP-U-03-119424
PATENT DOCUMENT 6: JP-A-53-035860

DISCLOSURE OF THE INVENTION

Problems to be Solved by the Invention

An object of the present invention is to provide a hollow fiber membrane module offering an improved effective utilization factor in the length direction of hollow fiber membranes and the stabilized amount of permeated water per unit membrane area, the hollow fiber membrane module suffering a reduced pressure drop and enabling water to be sampled with reduced energy, the hollow fiber membrane module being easily manufactured and being easy to produce in a reduced number of manufacture steps, as well as a hollow fiber membrane module assembly using the hollow fiber membrane module.

The present invention exerts more significant effects through the application of high-permeation-performance membranes.

Means for Solving the Problems

As a result of keen research for achieving the above-described object, the inventors have accomplished the object using the hollow fiber membrane module described below. That is, the present invention is as follows.

(1) A hollow fiber membrane module comprising a cylindrical module case, a bundle of a large number of hollow fiber membranes housed in the module case, adhesive fixing portions fixing respective opposite ends of the bundle in the module case so as to allow a raw fluid to pass through the hollow fiber membranes, a permeated fluid communication portion connecting opposite outer end surfaces of the adhesive fixing portions together via a pipe with a larger equivalent diameter than each of the hollow fiber membranes, and a raw-fluid distributive supply portion located at one of the adhesive fixing portion to enable the raw fluid to be fed into the module case, wherein the raw-fluid distributive supply portion comprises one supply source pipe portion drilled from a center of the outer end surface of the one of the adhesive fixing portions in a length direction of the module case and a raw-fluid supply branching portion evenly distributing the supplied raw fluid in a direction of a cross section of the hollow fiber membrane module, and has a plurality of raw-fluid introduction holes drilled in a gap between the hollow fiber membranes so as to enable the raw fluid to be fed along a longitudinal direction of the hollow fiber membranes.

(2) The hollow fiber membrane module set forth in (1), wherein a plurality of the raw-fluid distributive supply portions following the supply source pipe portion are drilled therein, each having an acute forward angle advancing from the supply source pipe portion along the length direction.

(3) The hollow fiber membrane module set forth in (2), wherein the raw-fluid distributive supply portion comprises raw-fluid introduction holes drilled so as to follow the raw-fluid supply branching portions and extend to an inner end surface of the adhesive fixing portion, and a sectional area of the plurality of raw-fluid supply branching portions increases along a forward flow direction of the raw water.

(4) The hollow fiber membrane module set forth in (2) or (3), wherein the raw-fluid supply branching portions are plate-like voids substantially parallel to the length direction, and a plurality of the raw-fluid supply branching portions are radially arranged in the raw-fluid distributive supply portion around the supply source pipe portion serving as a substantial center axis.

(5) The hollow fiber membrane module set forth in any one of (2) to (4), wherein the plurality of raw-fluid supply branching portions are 3 to 9 raw-fluid supply branching portions branching from the supply source pipe portion.

(6) The hollow fiber membrane module set forth in any one of (2) to (5), wherein a plurality of the raw-fluid introduction holes are formed in each of the raw-fluid supply branching portions, and a sum of equivalent diameters of the plurality of raw-fluid introduction holes is smaller than a maximum equivalent diameter of the plurality of raw-fluid supply branching portions.

(7) The hollow fiber membrane module set forth in any one of (2) to (6), wherein when each of the raw-fluid supply branching portions is divided into a central side and an outer side at a position of a half radius outward from the center of the raw-fluid supply branching portion, the sum of the equivalent diameters of the raw-fluid introduction holes formed in the outer-side division is larger than that of the raw-fluid introduction holes formed in the central-side division.

(8) The hollow fiber membrane module set forth in any one of (2) to (7), wherein the plurality of raw-fluid introduction holes are drilled at equal intervals.

(9) The hollow fiber membrane module set forth in any one of (2) to (8), wherein the equivalent diameter of the raw-fluid introduction hole increases with decreasing distance to an outer circumference of the module case.

(10) The hollow fiber membrane module set forth in any one of (1) to (9), wherein the permeated fluid communication portion is at least one communication pipe contained in the hollow fiber membrane bundle.

(11) The hollow fiber membrane module set forth in (10), wherein a number of the communication pipes is one to four.

(12) The hollow fiber membrane module set forth in (1), wherein the module case is an irregular-shaped double pipe comprising a first portion having a relatively large inner sectional area and a second portion having a relatively small inner sectional area, and the hollow fiber membrane bundle is housed in the first portion, whereas the permeated fluid communication portion is provided in the second portion.

(13) The hollow fiber membrane module set forth in any one of (1) to (12), wherein the inner end surface of the raw-fluid distributive supply portion is substantially flush with an inner end surface of an adhesive used to form the adhesive fixing portion.

(14) A process for manufacturing the hollow fiber membrane module set forth in (13), comprising molding at least a part of a raw-fluid distributive supply portion using a material which is easily dissolved into, or easily absorbed and dispersed in water, hot water, or an organic solvent not affecting a member comprising a hollow fiber membrane module, placing an inner end surface of the molded raw-fluid distributive supply portion inside the adhesive fixing portion, then adhesively fixing the raw-fluid distributive supply portion, a hollow fiber membrane, a permeated fluid communication portion, and a module case together, and then allowing at least a part of the raw-fluid distributive supply portion to be dissolved into or absorbed and dispersed in any of the water, the hot water, and the organic solvent to form the raw-fluid distributive supply portion.

(15) A hollow fiber membrane module assembly comprising a first cup (i) shaped like a cup comprising a permeated fluid supply port and (ii) having a permeated fluid holding space inside the cup shape, the first cup being fixed to an outside of an outer end surface of an adhesive fixing portion at a circumferential end side of the cup shape in a liquid-tight manner, the adhesive fixing portion including the raw-fluid distributive supply portion of the hollow fiber membrane module set forth in any of (1) to (13), and a second cup (a) shaped like a cup comprising a permeated fluid sampling port and (b) having a permeated fluid holding space inside the cup shape, the second cup being fixed to an outside of an outer end surface of another adhesive fixing portion at a circumferential end side of the cup shape in a liquid-tight manner, iii) the first cup comprising a nozzle extending continuously from the raw-fluid supply port in a liquid-tight manner and projecting into the permeated fluid holding space, and iv) the nozzle being coupled to the supply source pipe portion in a liquid-tight manner.

(16) A method of purifying suspended water wherein a raw fluid is water and a product of a turbidity of the water and TOC (Total Organic Carbon) is 10,000 degree×mg/liter or less and wherein water with a turbidity of at most 100 degrees and a TOC of 100 mg/liter or less and the hollow fiber membrane module set forth in (1) is used to obtain filtrate.

The description in the application uses names indicative of functions, such as a raw-fluid (raw-water) supply port, a raw-fluid (raw-water) distributive supply portion, a raw-fluid (raw-water) supply source pipe, a raw-fluid (raw-water) supply branching portion, a raw-fluid (raw-water) introduction hole, and a concentrated water discharge port. However, the names are used to make the contents of the present invention more easily understood, and are not limited to the functions.

Advantages of the Invention

The hollow fiber membrane module according to the present invention feeds and filters raw water parallel to the hollow fiber membranes. The hollow fiber membrane module according to the present invention thus enables a stable filtration operation and allows suspended components to be properly discharged during physical washing. Furthermore, permeated water can be sampled from the opposite sides. This improves the effective utilization factor of the hollow fiber membranes and enables a stable amount of permeated water to be sampled per unit membrane area with reduced energy. In this regard, significant performance can be achieved by applying high-permeation-performance membranes. Even with membranes with a conventional level of performance applied, the present invention limits a possible pressure drop during operation to a low range. This allows the hollow fiber membrane module to be operated with a relatively low operating pressure. Moreover, for example, the raw-water distributive supply portion can be easily and accurately positioned in the module case. Thus, the hollow fiber membrane module can be easily manufactured in simple manufacture steps. Furthermore, the hollow fiber membrane module according to the present invention can be mounted without change in a membrane filtration facility in which a hollow fiber membrane module to which raw water is fed through the bottom thereof and from which permeated water is sampled through the top thereof is mounted, with concentrated water discharged from the side surface of the top; conventional purification treatment based on external-pressure hollow fiber membrane filtration mostly uses the latter hollow fiber membrane module.

BEST MODE FOR CARRYING OUT THE INVENTION

The best mode for carrying out the present invention will be described below in detail with reference to the drawings. In the description below, by way of example, a hollow fiber membrane module assembly is vertically located. Furthermore, raw water or compressed air is fed through the bottom of the hollow fiber membrane module assembly. Thus, the forward flow direction of raw water during a normal membrane treatment is upward from the bottom. However, of course, the hollow fiber membrane module assembly may be placed horizontally or obliquely. Furthermore, here, the hollow fiber membrane module refers to a container which is filled with a large number of hollow fiber membranes; the opposite ends of each of the hollow fiber membranes are fixed with an adhesive, and a liquid can be passed through the hollow fiber membranes. The hollow fiber membrane module assembly refers to the hollow fiber membrane module with caps attached to the respective ends thereof. Each of the caps allows permeated water to be held therein and sampled therefrom or allows raw water to be fed therethrough.

A module structure will be described below with reference to an example of an external pressure-type hollow fiber membrane module in which a straight pipe in the module is applied as a permeated water communication portion. A sectional view of the example of the structure of an assembly of such hollow fiber membrane modules is shown in FIG. 1 (for easy understanding, some lines are omitted).

A hollow fiber membrane module 20 uses a cylindrical module case 21 having an open top surface and an open bottom surface, and a concentrated water or air discharge port 22 (hereinafter referred to as a discharge port 22) formed in the upper part of the side surface of the module case 21 and extending in the horizontal direction. Typically, the module case 21 preferably has a diameter selected from the range of 30 mm to 800 mm and a length selected from the range of 300 mm to 3,000 mm. Examples of available materials for the module case 21 include fluorine resins such as polytetrafluoroethylene, a tetrafluoroethylene-hexafluoropropylene copolymer resin, an ethylene-tetrafluoroethylene copolymer resin, and polyvinylidene-fluoride, polyolefins such as polyethylene, polypropylene, and polybutene, various polymer compounds such as polyvinyl chloride, an ABS (Acrylonitrile Butadiene Styrene) resin, an AS (Acrylonitrile Styrene) resin, polyester, polysulphone, polyether sulphone, and polyphenylene ether, and metals such as stainless steel and an aluminum alloy. A portion of the module case 21 having the concentrated water discharge port 22 may be separately molded and combined with another pipe-like portion. The portion having the concentrated water discharge port 22 may particularly be called a head portion.

A large number of hollow fiber membranes 24 (for simplification, only one hollow fiber membrane is illustrated) are housed in the module case. The hollow fiber membrane in the specification is not particularly limited provided that the membrane can be used for fluid treatment. Examples of materials for the hollow fiber membrane include polyacrylonitrile, polysulphone, polyether ketones, polyether sulphone, polyphenylene-sulfide, polyvinylidene-fluoride, celluloses, polyvinyl alcohol, polyamide, polyimide, sulfonated polyphenylene ether, polyethylene, polypropylene, polybutene, poly4-methylpentene, polyorganosiloxane, polyethylene-fluoride, and ethylene-tetrafluoroehylene copolymer, or a mixture or compound thereof. Furthermore, the types of membranes include an ultrafiltration filter with a molecular cutoff of 1,000 to 500,000 daltons and a microfiltration membrane with a pore diameter of 0.01 to 1 µm. Moreover, the available hollow fiber membrane is shaped so as to have an inner diameter of 50 to 3000 µm and an inner/outer diameter ratio of 0.3 to 0.8.

The opposite ends of the hollow fiber membrane are fixed in the module case by adhesive fixing portions 26 and 27, respectively, so that a liquid can be passed into the hollow fiber membrane through the opposite ends. Furthermore, the adhesive fixing portions 26 and 27 separates the exterior and interior of the module from each other in a liquid-tight manner. An adhesive may be used for the adhesive fixation. The type of the available adhesive may be appropriately selected taking into account the materials of the module case and the hollow fiber membrane and a communication pipe and a raw-water distributive supply portion described below. A thermosetting polymer material, for example, an epoxy resin, a urethane resin, or silicone, may be used as the adhesive. As an adhesive fixation method, a well-known method such as a centrifugal adhesion method may be used. The adhesive may further contain a fibrous substance such as glass fiber or carbon fiber or a fine powder such as carbon black, alumina, or silica because these substances may enhance the hardening and shrinkage and the strength of the adhesive.

The hollow fiber membrane module 20 includes a permeated water communication portion connecting the opposite outer end surfaces of the adhesive fixing portions 26 and 27 together so that a liquid can be passed through the outer end surfaces. The permeated water communication portion is a pipe having a larger equivalent diameter and offering a smaller channel resistance, than the above-described hollow fiber membrane 24. Even if the hollow fiber membrane has a large length of, for example, about 2 m, such a permeated water communication portion allows permeated water having permeated a portion of the membrane which is relatively close to a raw water supply port to be sampled with a small pressure drop. This significantly improves membrane utilization factor. The equivalent diameter may be calculated from the immersion side length of the inner circumference of the channel through which raw water or compressed air flows, based on hydrodynamics. However, just to make certain, the calculation method is described below.

The equivalent diameter in the specification is defined as De. Then, the equivalent diameter is determined by multiplying the inner sectional area S of the permeated water communication section by 4 and then dividing the product by the inner circumferential side length (the length over which a fluid contacts the inner cross section) L, as shown in:

$$De = 4 \times S/L.$$

The permeated water communication portion may be based on a method of placing a straight line in the module, a method of forming the module case itself into an irregular shaped double pipe, or the like. An example of the former method is shown in FIG. 1. In this example, a communication pipe 25 is contained in the bundle of the hollow fiber membranes 24 parallel to the hollow fiber membranes 24. The communication pipe has a larger equivalent diameter than each of the hollow fiber membranes 24 and allows permeated water to flow from the bottom to top of the module. At least one such communication pipe may be used. The number of communication pipes may be appropriately determined within a scope that allows the membrane utilization efficiency of the hollow fiber membrane module to be increased. In this case, the communication pipe 25 is adhesively fixed in the module case both on the sides of the upper adhesive fixing portion 26 and the lower adhesive fixing portion 27. Like the hollow fiber membrane 24, the communication pipe 25 is open so as to allow a liquid to pass to the interior of the module. Thus, permeated water or the like can pass easily through the communication pipe 25 from the top to bottom or bottom to top of the module.

Preferably, such a communication pipe is made by extruding a polymer material. Examples of available polymer materials include polyolefins such as polyethylene, polypropylene, and polybutene, polyvinyl chloride, polyester, polysulphone, polyethersulphone, polyphenylene ether, an ABS resin, and an AS resin. If a straight pipe is used as the communication pipe, the pipe may have any sectional shape such as a circle, an ellipse, a semicircle, or a spindle but needs to have a larger equivalent diameter and offer a smaller channel resistance, than the hollow fiber membrane.

Furthermore, by way of example, in the method of forming the module case itself into an irregular-shaped double pipe, the module case may be formed into an irregular-shaped double pipe made up of a first portion with a relatively large inner sectional area and a second portion with a relatively small inner sectional area. Then, a bundle of hollow fiber membranes may be housed in the first portion, and a permeated water communication portion may be provided in the second portion. In the example, the irregular-shaped double pipe is generally shaped like a cylinder the internal volume of which is divided into two by a plate parallel to the length direction such that the opposite ends of a circular arc that is a part of a circle in a cross section of the cylinder which is perpendicular to the length direction are connected together by a straight line so that the cross section is divided into a semicircular cross section (see FIG. 21) and another cross section. In this case, the semicircular sectional portion serves as a communication portion. The remaining portion is used to house the hollow fiber membranes. Such a hollow fiber membrane module can be produced by a method of joining an irregular-shaped double pipe extruded through an irregular-shaped double nozzle to a head portion with a double structure corresponding to the divided internal space. Alternatively, an opening may be formed in a part of the circumference of the side surface of the upper part of an extruded irregular-shaped double pipe. Then, a joint with a nozzle may be installed over the side opening in the irregular-shaped double pipe. In this case, a method described in Japanese Patent No. 3713343 may be adopted. If the irregular-shaped double pipe is used as a permeated water communication portion, the same material as that of the module case may be used. The permeated water communication portion may have a sectional shape different from the above-described one, such as a circle, an ellipse, a semicircle, or a spindle. The permeated water communication portion may be installed at one location or at two or more locations. FIGS. 21 to 25 show examples of irregular-shaped double pipes having the above-described and other shapes, respectively.

One of the adhesive fixing portions of the hollow fiber membrane module internally has a raw-water distributive supply portion that enables raw water to be fed into the module case. The raw-water distributive supply portion allows raw water supplied through the raw water supply port to be distributively and evenly fed to the hollow fiber membranes parallel thereto without causing an excessive pressure drop. The raw-water distributive supply portion provides the function of separating raw water from permeated water (which permeates the hollow fiber membranes from the lower portion thereof and flows from a permeated water circulation space provided outside the lower end surface of the module, through the communication pipe to a permeated water sampling port) in a liquid-tight manner and feeding the raw water to the periphery of the hollow fiber membranes in the hollow fiber membrane module. Furthermore, the raw-water distributive supply portion is used for a mixed flow of raw water and compressed air and the supply only of compressed air. Moreover, the raw-water distributive supply portion is used to discharge and drain water resulting from physical washing such as back washing or aeration. In this case, such a particular structure as described above allows raw water to be supplied with a reduced pressure drop and enables a hollow fiber membrane module to be manufactured in relatively simple manufacture steps.

The particular structure of the raw-water distributive supply portion will be described with reference to FIG. 1 (FIG. 3). The raw-water distributive supply portion is made up of a supply source pipe portion 34 through which raw water or the like is supplied, a raw-water supply branching portion 33 evenly distributing the supplied raw water or the like, in the direction of the cross section of the hollow fiber membrane module, and a raw-water introduction hole 32 through which the distributed raw water or the like is introduced into the outside of the hollow fiber membranes in the module.

First, the supply source pipe portion 34 is one cylindrical void drilled substantially parallel to the length direction of the module case from the substantial center of an outer end surface 29 of the adhesive fixing portion 27, located on the side on which the raw-water distributive supply portion is provided. The terms "substantial center" and "substantially parallel" as used herein need not be geometrically strictly central or parallel but may be central or parallel within a scope that enables a desired function to be fulfilled. This also applies to other terms with the word "substantial" or "substantially". A first cap nozzle described below is coupled to the supply source pipe portion in a liquid-tight manner using seal means such as an O ring seal.

In a certain method, a plurality of supply source pipe portions are provided in the outer circumferential portion of the module so as to allow raw water to be fed toward the center of the cross section of the module. In this case, as is apparent from Experiment Example 7 described below, if fluids with different viscosities need to be supplied, such as a liquid that is raw water, compressed air used for aeration washing, and a multiphase flow of raw water and compressed air, it is difficult to allow all of the fluids to be evenly fed with a possible pressure drop limited within a narrow range. However, provision of the single supply source pipe portion 34 enables raw water or the like to be fed into the module with a relatively small pressure drop. The position of the supply source pipe portion 34 on the outer end surface 29 need not necessarily be the center but may be close to the outer circumference. However, to allow raw water to be proportionately and evenly distributed in the module, the supply source pipe portion 34 is preferably located as close to the center as possible. Locating the supply source pipe portion 34 in the center facilitates the coupling of the first cap described below to the outer end surface 29 of the module.

Now, the raw-water supply branching portion 33, following the supply source pipe portion 34, will be described. The raw-water supply branching portion 33 is a void shaped like a plate which is substantially parallel to the length direction of the module and which has a surface 30 with an acute forward angle formed as the raw-water supply branching portion 33 advances from the supply source pipe portion 34 along the length direction of the module. Such a void enables raw water to be evenly distributed in the direction of the cross section of the module. The "forward angle" as used herein refers to one of the angles which, when a certain advancing direction branches at a branching point, are formed around the branching point by the advancing direction and the branching direction, the angle being formed between the branching direction and a reference line extending forward from the branching point in the advancing direction, as shown in FIG. 2(1). In FIG. 1, the raw-water supply branching portion 33 is shown as a part of the raw-water distributive supply portion with a funnel-shaped cross section.

The raw-water supply branching portion preferably has the above-described surface with the acute angle. This is because the surface allows the length of the void to decrease in the length direction of the module with increasing distance from the supply source pipe (center) with respect to the outer circumference of the module, enabling raw water or the like to be evenly fed from the center axis toward the outer circumference of the module. As a result, the sum of the sectional areas of the plurality of raw-water supply branching portions in the length direction of the module increases along the forward flow direction of raw water. Alternatively, the thickness of the plate-like void may be varied from the center to outer circumference of the module. Although also depending on the permeating capability of the hollow fiber membrane or the hollow fiber membrane module, the acute angle in the raw-water supply branching portion may be appropriately selected taking into account, for example, the diameter and shape of a raw water introduction hole described below.

Now, how the cross section of the raw-water supply branching portion is enlarged will be described with reference to FIG. 26. FIG. 26(3) shows the sectional area S1 of a cross section taken along line J-J' in FIG. 26(2). FIG. 26(4) shows the sectional area S2 of a cross section taken along line K-K' in FIG. 26(2). As seen in FIG. 26, the sectional area increases from S2 to S1 as the raw-water supply branching portion advances in the forward flow direction from the cross section K-K', close to the raw water supply side, toward the cross section J-J'.

Preferably, a plurality of the raw-water supply branching portions 33 are radially provided around the supply source pipe portion 34, serving as a substantial center axis. Specifically, 3 to 9 raw-water supply branching portions 33 are preferably provided in terms of the balance between, for example, the distributive evenness of raw water and air and the easiness of module production and the number of hollow fiber membranes that can be filled into the module. More preferably, 4 to 6 raw-water supply branching portions are provided. The plurality of raw-water supply branching portions may be branched at equal angles. However, the raw-water supply branching portions may be branched at slightly different angles. For example, a part of the raw-water supply branching portions to which the permeated water communication portion is attached may be branched at a larger angle. The hollow fiber membranes are arranged between the raw-water supply branching portions (see FIG. 2(2)). Furthermore, if a straight pipe is used in the module case as a communication pipe, the communication pipes are also arranged between the raw-water supply branching portions. A method for producing the raw-water supply branching portion 33 will be described below.

The raw-water introduction hole 32 is drilled continuously from the raw-water supply branching portion 33 to an inner end surface 31 of the adhesive fixing portion 27. Raw water is fed to the interior 23 of the module through the raw-water introduction hole 32. The raw-water introduction hole 32 may be drilled all over the inner end surface 31 of the raw-water supply branching portion 33. However, the raw-water introduction hole 32 is desirably formed as a set of a plurality of holes in order to facilitate the production of the raw-water supply branching portion and to allow raw water to be evenly distributed. If the raw-water introduction hole 32 is formed as a plurality of holes, the sum of the equivalent diameters of the plurality of raw-water introduction holes is smaller than the sum of the equivalent diameters of the plurality of raw-water supply branching portions in the direction of the length of the module. Here, a method for calculating the equivalent diameter of the raw-water supply branching portion will be described with reference to FIG. 26(3). The equivalent diameter De(a) of the raw-water supply branching portion 33 is determined by multiplying the sectional area S1 by 4 and dividing the product by the inner circumferential side length L1 (thick line portion), as shown in:

$$De(a)=4 \times S1/L1.$$

Furthermore, it is assumed that (m) raw-water introduction holes d1, d2, d3, . . . dm with different cross sections and different immersion side lengths are drilled in each of the (n) raw-water supply branching portions corresponding to the respective branching directions. When the opening sectional areas and immersion side lengths of the raw-water introduction holes are defined as s1, s2, s3, . . . sm and a1, a2, a3, . . . , am, the sum De(b) of the equivalent diameters of the holes is determined by:

$$De=n \times 4 \times \{(s1/a1)+(s2/a2)+(s3/a3)+ \ldots +(sm/am)\}.$$

A specific description will be given with reference to FIG. 26(1). If three types of holes d1, d2, and d3 are drilled at the respective positions in each of the four raw-water supply branching portions corresponding to the respective branching directions, when the opening sectional areas and immersion side lengths of the raw-water introduction holes d1, d2, and d3 are defined as s1, s2, and s3 and a1, a2, and a3, the sum De(b) of the equivalent diameters of a total of 12 holes is determined by:

$$De(b)=4 \times 4 \times \{(s1/a1)+(s2/a2)+(s3/a3)\}.$$

Each of the holes may be shaped like a circle, an ellipse, a semicircle, a rectangle, or the like but is preferably circular in order to facilitate the formation of the holes. Although depending on the amount of water supplied and the number of holes, the pore diameter of the raw-water introduction hole is preferably 5 to 12 mm. Moreover, the pore diameter is preferably such that in a cross section of the module perpendicular to the length direction thereof, the equivalent diameter of the raw-water introduction hole increases consistently with the distance from the center of the module with respect to the outer circumference thereof. This preferably allows raw water or the like to be more evenly introduced into the module. In this case, with the distribution of raw water kept even, the above-described acute angle can be set closer to 90 degrees. This enables a reduction in the required length of the adhesive fixing portion 27 in the length direction of the module. Here, the equivalent diameter of the raw-water introduction hole can be increased consistently with the distance from the center of the module with respect to the outer circumference thereof as follows. The introduction holes may be arranged such that the pore diameter itself increases sequentially with decreasing distance to the outside of the module. Alternatively, the portion between the center and the outer circumference may be divided into two or three areas, a plurality of holes with different inner sectional areas may be drilled in each of the resulting areas, and the sum of the equivalent diameters or sectional areas in each of the areas is increased from the center toward the outer circumference. Alternatively, the raw-fluid branching portion may be divided into a central side and an outer side at the position of a half diameter in the outward direction from the center so that the sum of the equivalent diameters of the raw-fluid introduction holes formed in the outer side is larger than that of the equivalent diameters of the raw-fluid introduction holes formed in the central side.

Furthermore, the intervals between the holes may be equal or different depending on the position of the hole. However, if the outer circumference-side holes have a larger pore diameter, the intervals are preferably equal in order to facilitate the formation of the holes. On the contrary, the pore diameter may be set constant with the interval decreasing consistently with the distance to the outer circumference. Furthermore, the raw-water introduction holes may be arranged on the inner end surface 31 in a line or staggeredly with respect to the respective raw-water supply branching portions. Alternatively, the raw-water introduction holes may be arranged in two or more rows. Furthermore, the introduction holes may be open perpendicularly or obliquely to the inner end surface of the raw-water supply branching portion.

FIG. 2(2) shows a diagram of a cross section A-A' of the hollow fiber membrane module in FIG. 1 as viewed from above (in the direction of the arrow in the FIG. 1). Four raw-water supply branching portions are arranged in the cylindrical module case 21 in cross form such that the angle between the adjacent raw-water supply branching portions is set to 90 degrees. A plurality of the raw water introduction holes 32 are arranged on the module inner end surface 31 of each raw-water supply branching portion in a line. Furthermore, the equivalent diameter of the raw-water introduction hole increases consistently with the distance from the center of the module cross section toward the outer circumference thereof.

Additionally, large numbers of the hollow fiber membranes 24 and the communication pipes 25 are arranged between the four raw-water supply branching portions. That is, the raw-water introduction holes are drilled in the clearance between the hollow fiber membranes. If the communication pipes are also arranged between the raw-water supply branching portions, the raw-water introduction holes are also drilled in the clearance between the communication pipes. Thus, in the module cross section, the raw-water introduction holes 32, through which raw water is fed, are arranged appropriately separately from the hollow fiber membranes 24 and the communication pipes 25. The cross section in FIG. 1 is as viewed from a cross section B-B' in FIG. 2(2).

The hollow fiber membrane module constructed as described above allows raw water or compressed air to be evenly fed with a small pressure drop. This is because the size of a space extending to the raw-water introduction hole is maximized to allow raw water to be fed without an increase in supply loss and the pore diameter of the raw-water introduction hole is reduced to a predetermined value to impose a small pressure drop to allow raw water to be evenly fed into the module. Furthermore, preferably, the supply flow of raw water or compressed air from the raw-water introduction hole into the module is substantially parallel to the length direction of the hollow fiber membrane. This allows a reduction in the load of a water flow or the like on the hollow fiber membrane. The "substantially parallel" as used herein refers to the distributive feeding of raw water or compressed air to the hollow fiber membranes at an angle of less than 45 degrees.

The hollow fiber membrane module is formed into a hollow fiber membrane module assembly by attaching a predetermined cap to the outside of the end surface of each of the opposite ends of the module in a liquid-tight manner. The outer end surface of the side of the hollow fiber membrane module on which the raw-water distributive supply portion is provided forms a cup shape with the raw-water supply port. A first cup with a permeated water holding space is mounted inside the cup shape. In FIG. 1, a cap 50 positioned at the lower end of the hollow fiber membrane module 20 corresponds to the first cap. The cap 50 is mainly composed of a cup 41 having a curved surface which covers the lower end surface 29 of the hollow fiber membrane module and which is tapered downward. An O ring 25 and a groove therefor are formed in a circumferential end surface of the cup 41 which contacts the lower end surface 29. Thus, the cap 50 is coupled to the hollow fiber membrane module in a liquid-tight manner.

Furthermore, a raw-water supply port 43 is open at the bottom of the center of the cup 41. A nozzle 42 extending continuously from the raw-water supply port 43 projects into the inner space of the cup 41. The nozzle 42 is coupled to the supply source pipe portion 34 of the hollow fiber membrane module in a liquid-tight manner. The inner space of the cup 41 surrounded by the cup 41, the nozzle 42, and the lower end surface 29 serves as a permeated water holding chamber 44. Mounting of such a cap allows raw water to be fed into the module with a reduced pressure drop, and further enables the utilization efficiency of the hollow fiber membrane to be kept high.

A specific example of the first cap is shown in FIG. 5. FIG. 5(1) is a top view. FIG. 5(2) is a front view. FIG. 5(3) is a sectional view taken along line G-G'. FIG. 5(4) is a bottom view. The cap in FIG. 5 includes a disc 41 shaped like a shallow cup or deep dish with a central recess (hereinafter simply referred to as a cup-shaped disc), a thick ring portion 45 provided all along the outer circumference of the disc 41, and a groove 46 formed in the circumferential end side of the ring portion so as to hold an O ring fixing the cap to the outer end surface of the module in a light-tight manner. Furthermore, a relatively short pipe 48 is provided in the center of the disc 41 and has a flange 40 around the outer circumference of the end thereof. The pipe 48 is provided on the protruding surface side of the disc 41 so as to form the raw-water supply port 43. On the recessed surface side corresponding to the inside of the disc 41, the nozzle 42 projects, and the raw-water supply port 43 extends continuously to the tip of the nozzle in a liquid-tight manner. When the hollow fiber membrane module assembly is constructed, the space in the recessed surface of the disc 41 forms a permeated water holding chamber between the recessed surface and the outer end surface of the hollow fiber membrane module.

Furthermore, FIG. 6 shows an example of a first cap with different shape. In this cap, a pipe 48' forming a raw-water supply port is longer than that in the example in FIG. 5. Moreover, instead of the flange, an antislip groove is formed in the outer circumference of the vicinity of a lower end 40' of the pipe. The first cap needs to provide two functions. First, the first cap needs to allow raw water to be fed to the supply source pipe portion of the hollow fiber membrane module through the raw water supply port via the nozzle in a liquid-tight manner. Second, the first cap needs to allow the permeated water holding chamber to be formed between the cap and the lower end surface of the hollow fiber membrane module in a liquid-tight manner. Provided that the two functions are fulfilled, the first cap is not limited to the shapes in FIGS. 5 and 6.

An example of a second cap corresponds to a cap 10 coupled to the upper end surface of the hollow fiber membrane module 20 via an O ring 15 as shown in FIG. 1. The cap 10 has a permeated water sampling port 13 provided in the center thereof and having a flange 11 at the outer circumferential end thereof. The permeated water sampling port 13 is continuous with an intra-cap space 14.

The above-described O rings may be used to couple the outer circumferential end of the first or second cap and the outer end surface of the hollow fiber membrane module together in a liquid-tight manner and to couple the nozzle of the first cap and the supply source pipe portion of the hollow fiber membrane module together in a liquid-tight manner. However, it is possible to use a sealing scheme based on a packing or adhesion based on application of an adhesive. In the example in FIG. 1, a metal cap tightening jig 52 is used to removably fix the second cap to the lower end surface 29 of the hollow fiber membrane module. Furthermore, a similar jig 51 is used to fix the first cap to the upper end surface of the module.

The caps may be made of metal such as stainless steel or aluminum alloy or a polymer material. If the caps are made of metal, for example, stainless steel, the caps may be produced by machining but are desirably made by casting, particularly, a precision casting method such as lost wax or MIM because this allows part accuracy to be improved. Furthermore, if the caps are made of a polymer material, the caps are desirably produced by an injection molding method in order to ensure part accuracy. Examples of available polymer materials include polyolefins such as polyethylene, polypropylene, and polyethersulphone, polyvinyl chloride, polyester, polysulphone, polyethersulphone, polyphenylene, an ABS resin, and an AS resin.

The caps are used not only for the supply of raw water and the sampling of permeated water or the formation of the permeated water holding chamber but also for the supply of compressed air or raw water mixed with compressed air, physical washing such as back washing or aeration, and drainage as is the case with the above-described raw-water distributive supply portion. The raw-water supply port in the first cap and the permeated water sampling port in the second cap preferably include a joint that can be connected to a line to a membrane separation apparatus, for example, the flange in FIG. 5 or the groove formed near the lower end 40' as shown in FIG. 6.

Now, a liquid flow during normal filtration using the hollow fiber membrane module assembly in FIG. 1 will be described with reference to FIG. 7. First, raw water is fed from the raw-water supply port 43 in the first cap 50 through the nozzle 42, the supply source pipe portion 34, the raw-water supply branching portion 33, and the raw-water introduction holes 32 to a space 23 surrounding the hollow fiber membranes 24 in the module. The supplied raw water permeates the hollow fiber membrane 24 from the outer surface to inner surface thereof. The resulting permeated water moves through the upper and lower openings of the hollow portion of the hollow fiber membrane 24 to the upper and lower intra-cap spaces 14 and 44, respectively. Then, the permeated water sampled from a relatively high portion of the hollow fiber membrane is sampled directly through the permeated water sampling port 13 via the second cap 10. However, the permeated water having moved into the cap 50 through the lower opening is held in the permeated water holding chamber 44. The permeated water then moves to the internal space of the upper cap 10 via the communication pipe 25 through the lower opening thereof. The permeated water is then sampled from the internal space. Furthermore, concentrated water resulting from removal of the permeated water from the raw water and air mixed in the raw water are discharged through the discharge port 22 on the side surface of the top of the module.

As described above, the permeated water is sampled from the opposite sides of the hollow fiber membrane 24. This levels off a pressure drop resulting from the flow of the permeated water on the inner surface side of the hollow fiber membrane. Thus, the lower half of the hollow fiber membrane in the hollow fiber membrane module contributes more to filtration. As a result, the treated flow rate per membrane area is leveled off with respect to the position of the membrane in the module. This eliminates the need to increase filtration pressure more than required, enabling a reduction in the liquid transfer pressure of a raw water transfer pump used for pressurization. Therefore, power consumption per predetermined permeated water sample amount is reduced.

Similarly, a liquid flow during back washing using the hollow fiber membrane module assembly in FIG. 1 will be described with reference to FIG. 8. Part of the sampled permeated water is supplied through the permeated water sampling port 13 in the cap 10. Then, part of the supplied water is fed directly through the upper opening of the hollow portion of the hollow fiber membrane 24 as back washing water. However, the remaining part is fed through the communication pipe 25 into the lower permeated water holding chamber 44 and then from the permeated water holding chamber 44 into the hollow fiber membrane 24 through the lower opening thereof as back washing water. This levels off the pressure distribution in the hollow portion of the hollow fiber membrane, enhancing the back washing effect in the lower part of the hollow fiber membrane. Washing effluent during the back washing may be discharged through the concentrated water discharge port 22 in the side surface of the upper portion or only through the raw-water supply port 43 with the circulatory supply of permeated water to the lower part of the hollow fiber membrane via the communication pipe maintained as shown in FIG. 9. The washing effluent may be discharged through both the concentrated water discharge port 22 and the raw-water supply port 43.

During flushing, raw water is fed from the lower raw-water supply port 43 to the intra-module space 23 via the raw-water distributive supply portion. Most of the raw water is discharged through the concentrated water discharge nozzle 22 to eject suspended substances from the module by a water flow at a high flow velocity. The suspended substances are deposited on the outer surface of the hollow fiber membrane 24 and in the gap between the hollow fiber membranes. In aeration flushing, raw water mixed with compressive gas such as compressed air is introduced into the intra-module space 23 through the lower raw-water supply port 43. With aeration performed to shake the hollow fiber membrane 24, the raw water is discharged through the concentrated water discharge nozzle 22 together with suspended solutions.

FIG. 10 shows a liquid flow during aeration back washing using the hollow fiber membrane module assembly in FIG. 1. Permeated water is fed through the upper permeated water supply port 13 and subject to back washing. Concurrently, compressed air is fed through the lower raw-water supply port 43. The water used for the back washing and the compressed air are discharged through the concentrated water discharge nozzle 22. At this time, the permeated water used for the back washing exerts pressure on the inner surface side of the hollow fiber membrane 24. However, the hollow fiber membrane 24 is pressurized, via the communication pipe 25, through the openings in both the upper and lower end surfaces of the hollow fiber membrane 24. Thus, the pressure exerted on the inner surface acts uniformly in both the upper and lower portions of the membrane. This enhances the effect of the aeration back washing.

Now, the formation of a permeated water communication portion using a module case that is an irregular-shaped double pipe will be described with reference to FIG. 11. In FIG. 1, at least one straight pipe is used as the communication pipe 25. However, in the hollow fiber membrane module in FIG. 11, a module case that is an irregular-shaped double pipe is used in place of the straight pipe used as the communication pipe in FIG. 1. A part of the irregular-shaped portion which has a reduced opening sectional area is used as a permeated water communication portion (hereinafter simply referred to as an irregular-shaped communication portion). The remaining part of the structure of the hollow fiber membrane module in FIG. 11 is almost the same as that in FIG. 1.

The "irregular-shaped double pipe" as used herein refers to a pipe having a cross section at right angles to the length direction thereof which cross section is not shaped like such a circle as in the module case in FIG. 1 but is pre-divided into two portions using a structure in which the interior of the pipe is partitioned by a wall or in which at least two pipes externally contact each other. The irregular-shaped double pipe may have a plurality of irregular-shaped communication portions. However, a single irregular-shaped communication portion can sufficiently provide the appropriate functions and is thus preferable in view of the moldability of the pipe during extrusion. The hollow fiber membrane and the irregular-shaped communication portion are open in both the upper and lower adhesive fixing portions. Thus, permeated water can be passed downward or upward.

The raw-water distributive supply portion is adhesively fixed in the lower adhesive fixing portion in such a way as to be almost buried therein. Then raw-water supply source pipe portion of the raw-water distributive supply portion is joined to the lower first cap in a liquid-tight manner. The liquid-tight junction may be based on a sealing method using a seal part such as an O ring or adhesion based on application of an adhesive as in the case of FIG. 1. FIG. 11 shows an example using a liquid-tight seal based on an O ring. The upper and lower caps are fixed to the hollow fiber membrane module using clamps.

Now, a liquid flow during normal filtration using the hollow fiber membrane module assembly with the irregular-shaped double pipe will be described with reference to FIG. 11. Raw water is fed into the module through the lower first cap. The supplied raw water permeates the hollow fiber membrane from the outer surface to inner surface thereof. The resulting permeated water moves through the upper and lower openings of the hollow portion of the hollow fiber membrane to the upper and lower intra-cap spaces, respectively. Then, the permeated water sampled from the top of the hollow fiber membrane is obtained via the second cap. However, the permeated water having moved to the lower intra-cap space (permeated water holding chamber) moves from the lower opening to upper opening of the irregular-shaped communication portion. The permeated water is then sampled from the upper cap. The water flow during back washing, aeration flushing, or aeration back washing is similar to that shown in FIG. 1 except for functions of the permeated water communication portion, and will thus not described below.

In the example of the structure of the hollow fiber membrane module in FIG. 11, the concentrated water holding chamber including the concentrated water nozzle from the side surface of which concentrated water is discharged is sealed, via an O ring, to the side surface of the outer pipe of the irregular-shaped double pipe. Specifically, a method described in Japanese Patent No. 3713343 can be used. However, when the module case is produced, the components may be sealably pre-fixed together in a liquid-tight manner by means of soldering or adhesion. Alternatively, the pipes may be joined together such that the communication portion includes the concentrated water holding portion.

Now, a method of manufacturing a hollow fiber membrane module will be described focusing on a method of forming a raw-water distributive supply portion. The remaining part of the manufacture method is similar to that for conventional hollow fiber membrane modules. First, such a hollow member as shown in FIG. 3 is prepared. FIG. 3(1) is a top view of the hollow member. FIG. 3(2) is a sectional view of the hollow member taken along line C-C' in FIG. 3(1). FIG. 3(3) is a front view of the hollow member. FIG. 3(4) is a sectional view of the hollow member taken along line D-D' in FIG. 3(3). FIG. 3(5) is a bottom view of the hollow member. The hollow member includes a pipe portion 35 serving as a supply source pipe portion, four hollow plates 37 and 38 arranged radially around the pipe portion 35, corresponding to a center axis, and at right angles to one another so as to form a cross (the hollow plates 37 and 38 serve as a raw-water supply branching portion), and a plurality of holes 32 formed in a line along the top surface of each of the hollow plates (the holes serve as raw-water introduction holes). Furthermore, a rib 39 is provided at the lower end of each of the hollow plates 37 and 38 for alignment (centering) in the module. Moreover, a bottom surface 30 of an internal void in the hollow plate is tapered at an acute angle θ to the center axis. Although not shown in the drawings, a cross section taken along line E-E' is rectangular. A cross section closer to the tip (outer circumference side) of the rib 39 has a shorter vertical length. The lower end of the pipe portion 35 is sealed by a surface 36 so as to prevent an adhesive from entering the interior of the pipe portion 35 during adhesive fixation. An example of another hollow member is shown in FIG. 4. In this hollow member, the number of holes 32' (serving as raw-water introduction holes) formed in the top surface is larger than that in the example in FIG. 3. The hole closest to the center of the hollow member in this example is closer to the center than that in the example in FIG. 3.

A material for the hollow members may be metal such as stainless steel or aluminum alloy but is preferably a polymer material in terms of the productivity and costs of the holding members. Specific examples of available materials include polyolefins such as polyethylene, polypropylene, and polybutene, polyvinyl chloride, polyester, polysulphone, polyethersulphone, polyphenylene, an AS resin, and an ABS resin. When made of a polymer material, the hollow member is preferably a molding article produced by injection molding so as to increase the dimensional accuracy of the equivalent diameter of the raw-water introduction hole as well as the sealing accuracy of the O ring. In this case, the surface portion of the hollow member which is bonded with an adhesive is preferably textured in order to increase the adhesive strength with the adhesive.

Using any of the hollow members, the raw-water distributive supply portion is formed as follows. A bundle of a large number of the hollow fiber membranes is inserted into the module case, and the communication pipe is inserted into the module case as required. Moreover, the hollow member is inserted into the module case from the lower end side thereof so that the directions of the module case and the hollow member match. In this condition, an adhesive is filled into the module case through the opposite ends thereof and solidified. At this time, the amount of adhesive provided through the end side from which the hollow member has been inserted is adjustably reduced so as not to block the holes 32 in the hollow member. Once the adhesive is solidified, each of the opposite ends is cut at an appropriate position so as to form a surface at right angles to the length direction of the module. Thus, the hollow portions of each of the hollow fiber membranes, the communication pipe, and the pipe portion 35 are opened to form a supply source pipe portion of a raw-water distributive supply portion. A hollow fiber membrane module is thus obtained.

According to the present manufacture method, the top plane 31 of the hollow member corresponds to the inner end surface 31 of the adhesive fixing portion 27 of the hollow fiber membrane module. The height of the top plane 31 is different from that of an inner end surface 28 formed by the solidified adhesive.

On the other hand, in a second method described below, the height of the top plane 31 of the hollow member may be set the same as that of the inner end surface 28 of the adhesive. In this method, the top plane 31 is flush with the inner end surface 28 of the adhesive. This advantageously eliminates a possible dead space. The manufacture method allowing the top plane 31 and the inner end surface 28 to be set at the same height will be described below with reference to FIG. 12.

The inner end surface 28 of the adhesive and the inner end surface 31 may be set at the same height, for example, as follows. First, a liquid such as water, hot water, or an organic solvent is prepared which does not affect the member making up the hollow fiber membrane module assembly. A material that can be easily dissolved into or easily absorbed and dispersed in the liquid is used to mold plug parts 60 temporarily blocking the raw-water introduction holes. Then, as shown in FIG. 12(2), the molded plug parts 60 are inserted into the raw-water introduction holes in the hollow member shown in FIG. 12(1) and which are similar to those described above, to temporarily block the holes. At this time, the plug parts are inserted such that the height of the plug parts projecting from the top surface of the hollow member is larger than that of a surface corresponding to the adhesive fixing portion.

The hollow member in this condition is housed at a predetermined position in the module case 21 together with the hollow fiber membranes as well as the communication pipe as required. The adhesive 27 is filled and solidified for adhesive fixation so that the whole hollow member is buried in the adhesive 27 but not the top of each of the plug parts 60, as shown in FIG. 12(3). Once the adhesive on the inner end surface is solidified, the end of the module case is cut along a cutting line to open the bottom of the hollow member as well as the hollow fiber membranes and the communication pipe. Here, description will be given below of an example of a method of preventing the top of each of the plug parts 60 from being buried under the inner end surface of the adhesive fixing portion.

A module case having a lower header to which a discharge port 22 similar to that of an upper header is attached is used to arrange the plug parts 60 inside the discharge port 22. Then, centrifugal adhesion is performed to adhesively fix the hollow portion with an unwanted part of a liquid thermosetting resin removed through the discharge port 22. Thus, the hollow fiber membrane module can be produced so as not to bury the plug parts 60.

Then, as shown in FIG. 12(4), a lower cap 50 is mounted in the hollow fiber membrane module. Furthermore, the upper cap is similarly mounted to form a hollow fiber membrane module assembly. Then, as shown in FIG. 12(5), the liquid 43 such as water, hot water, or an organic solvent which has been prepared as described above is fed into the module through the raw-water supply port in the lower cap. The plug parts blocking the raw-water introduction holes are dissolved into or absorbed and dispersed in the liquid and thus disappear. The present method prevents the formation of a step between the inner end surface of the adhesive and the inner end surface of the adhesive fixing portion. Thus, a proper hollow fiber membrane module or an assembly thereof are obtained which have no dead space.

The following are examples of materials that are dissolved into or absorbed and dispersed in the liquid such as water, hot water, or an organic solvent without exerting an adverse effect such as dissolution on the hollow fiber membranes and other components of the hollow fiber membrane module assembly: polysaccharides and celluloses such as starch, cellulose acetate, and ethylcellulose, and a mixture thereof, and carbonates, hydrogen carbonates, phosphates, and acetates of sodium and potassium. To form the hollow member using polysaccharide or cellulose, the material is desirably mixed with carboxycellulose or the like which serves as a binder. When carbonate or the like is used, it is desirable to thermally dissolve and pour salt into a cast or to pack the material into a wet condition and then dry and solidify the material.

Moreover, not only any of the above-described materials may be used to form the plug parts but also the following is possible. Only a pipe portion of the hollow member which corresponds to the raw-water supply source pipe portion is formed of metal or a polymer material. The raw-water supply branching portion is formed using a dissolvable material. Then, the raw-water supply source pipe portion and the raw-water supply branching portion are assembled together to form a raw-water distributive supply portion. Alternatively, the whole hollow member forming the raw-water distributive supply portion may be formed using any of the above-described materials. Alternatively, the plug parts may be pre-inserted into the hollow member. Any of these methods provides a suitable hollow fiber membrane module with a reduced pressure drop.

The raw fluid used in the present invention is preferably water. Preferably, the product of the turbidity and TOC (Total Organic Carbon) of the raw water is 100,000 degrees×mg/liter or less. The raw water preferably has a turbidity of 100 degrees or less and a TOC of 100 mg/liter or less.

EXAMPLES

Now, the present invention will be described with reference to experiment examples, examples, and comparative examples. Comparison of performance with conventional hollow fiber membrane module assemblies was performed using a multi-sequence evaluation apparatus having independent raw-water supply pumps and independent back washing supply pumps and a common raw water tank and a permeated water tank (also used as a back washing tank). The evaluation apparatus uses an inverter to control the raw-water supply pumps for the multiple sequences and allows power consumption to be monitored. Furthermore, river surface stream water was used as raw water except for Example 4 and Comparative Example 3 (In Example 4 and Comparative Example 3, evaluation was performed based on a closed line using a model liquid).

The turbidity and TOC of the raw water were measured by the following method.

Turbidity: UV-160A, 50-mm cell manufactured by Shimadzu Corporation was used as a measurement apparatus to measure the turbidity in conformity with JIS K0101 9.2. (For a turbidity of 50 degrees or more, the raw water was diluted with water).

TOC: TOC-5000A manufactured by Shimadzu Corporation was used as a measurement apparatus to measure TOC in conformity with JIS K0101 20.1.

Experiment Example 1

First, experiments were carried out on the appropriate bore diameters of the raw-water introduction holes and the positions and number of the holes. As shown in FIG. 13(1), a pipe 72 made of polyvinyl chloride was prepared which had six circular holes 73 of 5 mm formed in a side surface thereof in a line at intervals of 10 mm and having a nominal diameter of 20 mm (outer diameter: 26 mm; approximate inner diameter: 20 mm) in conformity with JIS K6742. An end cap 71 was attached to one end of the pipe 72, and a tee 74 was attached to the other end thereof. Thus, a test part was prepared. A pressure gauge was attached to a right-angle branch of the tee, and a joint was attached to another branch so as to allow water or compressed air to be supplied (this construction is hereinafter collectively referred to as a supply pipe). The supply pipe was used to supply 27 [L/min] of water under atmospheric pressure. Then, water was uniformly discharged from the holes. At this time, to allow 27 [L/min] of water to be supplied, a water supply pressure of 19 [KPa] measured by the pressure gauge was required. Then, the same supply pipe was used to supply 1.2 [Nm$^3$/Hr] of compressed air of pressure 200 [KPa] at a water depth of about 30 cm. Then, air was uniformly discharged from all the holes.

Experiment Example 2

A polyvinyl chloride pipe of nominal diameter 20 mm as shown in FIG. 13(2) was prepared which was similar to that in Experiment Example 1 except that the pipe had circular holes of diameter 5.5 mm, 6.0 mm, 6.5 mm, and 7.0 mm, respectively, formed in a side surface thereof at intervals of 15 mm. The pipe was used to supply 27 [L/min] of water under atmospheric pressure. Then, water was uniformly discharged from the holes. At this time, to allow 27 [L/min] of water to be supplied, a water supply pressure of 17 [KPa] measured by the pressure gauge was required. Then, the same supply pipe was used to supply 1.2 [Nm$^3$/Hr] of compressed air of pressure 200 [KPa] at a water depth of about 30 cm. Then, air was uniformly discharged from all the holes.

Experiment Example 3

Such a supply pipe as shown in FIG. 13(3) was prepared which had the same circular hole diameter and opening interval as those in Experiment Example 1 but had a nominal pipe diameter of 13 mm (outer diameter: 18 mm; approximate inner diameter: 13 mm). Water and compressed air were supplied as in the case of Experiment Example 1. Then, water was uniformly supplied, and the required supply pressure was 25 [KPa]. However, for the air supply, air sometimes failed to be discharged from the hole located farthest from the tee.

Experiment Example 4

Such a supply pipe as shown in FIG. 13(4) was prepared which had the same circular hole diameter and opening interval as those in Experiment Example 2 but had a nominal pipe diameter of 13 mm. Water and compressed air were supplied as in the case of Experiment Example 1. Then, water was uniformly supplied, and the required supply pressure was 23 [KPa]. However, for the air supply, air sometimes failed to be discharged from the hole located farthest from the tee.

Experiment Example 5

A hollow element (which was made of polyvinyl chloride) was produced which was similar to that shown in FIG. 3 except that the bottom surface 36 was open. A tee was attached to the pipe portion 35. Moreover, a pressure gauge was attached to the tee, and a joint was attached to the tee so as to allow water or compressed air to be supplied. In the hollow element, the pipe portion 35 was a straight pipe of inner diameter 26 mm. Furthermore, four hollow plates were combined together in cross form. Circular holes 32 of diameter 5.5 mm, 6.0 mm, 6.5 mm, and 7.0 mm were formed in the top surface 31 of each of the hollow plates so as to lie in this order from the center of the hollow element at intervals of 15 mm. Furthermore, the hollow portion inside the hollow plates appeared rectangular in a sectional view taken along line E-E'. The equivalent diameter and opening sectional area of the hollow portion were about 20 mm and 610 mm$^2$ in a rectangular cross section closest to the center axis and about 13 mm and 200 mm$^2$ at a terminal farthest from the center axis.

The hollow element was used to supply 5 [m$^3$/Hr] of water under atmospheric pressure. Then, water was uniformly discharged from all the holes. At this time, to allow 5.0 [m$^3$/Hr] of water to be supplied, a water supply pressure of 4 [KPa] measured by the pressure gauge was required. Then, the same hollow element was used to supply 7 [Nm$^2$/Hr] of compressed air of pressure 200 [KPa] at a water depth of about 50 cm. Then, air was uniformly discharged from all the holes. Additionally, even when the flow rate of compressed air was reduced to 5 [Nm$^3$/Hr] or 3 [Nm$^3$/Hr], air was similarly uniformly discharged.

Experiment Example 6

A hollow element (which was made of polyvinyl chloride) was produced which was similar to that shown in FIG. 4 except that the bottom surface of the pipe portion was open. A tee was attached to the pipe portion. A pressure gauge was attached to the tee. A joint was also attached to the tee so as to allow water or compressed air to be supplied. The pipe portion of the hollow element was a straight pipe of inner diameter 26 mm. Furthermore, the hollow plates were shaped like a cross. Six circular holes 32 of diameter 5 mm were formed in a top surface 31' of each of the hollow plates at intervals of 10 mm. Furthermore, as in the case of the member shown in FIG. 3, the hollow portion inside the hollow plates was a void having a rectangular cross section in the direction E-E'. The equivalent diameter and opening sectional area of the hollow portion were about 22 mm and 600 mm$^2$ on the central side and about 13 mm and 200 mm$^2$ at the outer circumferential terminal.

The raw-water distributive supply portion was used to supply 4.8 [m$^3$/Hr] of water under atmospheric pressure. Then, water was uniformly discharged from all the holes. At this time, to allow 4.8 [m$^3$/Hr] of water to be supplied, a water supply pressure of 3 [KPa] measured by the pressure gauge was required. Then, the same raw-water distributive supply portion was used to supply 5 [Nm$^2$/Hr] of compressed air of pressure 200 [KPa] at a water depth of about 50 cm. Then, air was uniformly discharged from all the holes. Additionally, even when the flow rate of compressed air was reduced to 3 [Nm$^3$/Hr], air was similarly uniformly discharged.

Experiment Example 7

Such an element 80 as shown in FIG. 14 was prepared which had an air introduction structure similar to that shown in FIG. 5 of JP-U-63-111901. In Experiment Example 7, the air introduction structure in JP-U-63-111901 was used as raw water and an air introduction element. The element 80 had four raw water introduction plates 82 and 83 combined together at right angles to one another, raw-water introduction passages 84 and 86 that are pipe-like voids drilled in the raw-water introduction plates so as to extend at right angles to one another, and an outer ring 81 forming a slit through which raw water is passed from a pipe portion 87 to the raw-water introduction passage. A tee was attached to the pipe portion 87. A pressure gauge was attached to the tee. A joint was also attached to the tee so as to allow water or compressed air to be supplied. In the element 80, the outer ring 81 had an inner diameter of 149 mm, and the slit had a width of 3 mm. Furthermore, the raw-water introduction passage had a diameter of 8 mm.

A holding chamber for holding permeated water and otherwise provided under an adhesive fixing portion 85 was unnecessary in Experiment Example 7 and was thus omitted.

The element was used to supply 3.3 [m$^3$/Hr] of water under atmospheric pressure. Then, water was uniformly discharged from the four introduction holes. At this time, 7.2 [KPa] of supply pressure was determined to be required to supply 3.3 [m$^3$/Hr] of water. To allow about 5 [m$^3$/Hr] of water to be discharged as in the case of Experiment Examples 5 and 6, an excessive supply pressure of about 150 to 165 [KPa] was expected to be required. Thus, further water supply experiments were suspended. When the supply pressure was set to 4 [KPa] as in the case of Experiment Examples 5 and 6, the supply flow rate was 0.8 [m³/Hr]. No water was discharged from one of the four holes. Furthermore, the same element was used to supply 5 [Nm²/Hr] of compressed air of pressure 200 [KPa] at a water depth of about 50 cm. Then, air was uniformly discharged from all the holes. Additionally, even when the flow rate of compressed air was reduced to 3 [Nm³/Hr], air was similarly uniformly discharged.

Experiment Example 8

Such an element 130 as shown in FIG. 20 was prepared which had an air introduction structure similar to that shown in FIGS. 2 and 3 of JP-U-03-119424. In Experiment Example 8, the air introduction structure in JP-U-03-119424 was used as raw water and an air introduction element. The element 130 had six holes each of diameter 10.5 mm drilled, at intervals of 120 degrees, along a circumference in an adhesive fixing portion 133 which is located at the position of a diameter of 96 mm from the center. A second cap was fastened to the lower end surface of the element 130 via an O ring using a cap fastening jig 132. A tee with a flange was attached to a flange portion 134 at the second cap end. Moreover, a pressure gauge was attached to the tee. A joint was also attached to the tee so as to allow water or compressed air to be supplied. Here, the water or compressed air was fed from the flange portion 134 into the second cap via the raw-water supply port and then flow into the module via the raw-water introduction passage 131.

A holding chamber holding permeated water and otherwise provided in an adhesive fixing portion 133 was unnecessary in Experiment Example 8 and was thus omitted.

The element was used to supply 4.8 [m³/Hr] of water under atmospheric pressure. Then, water was uniformly discharged from the six introduction holes. At this time, the pressure required for the supply was low, 5 [kPa], as in the case of Experiment Examples 5 and 6. Then, the element 130 was used to supply 7 [Nm³/Hr] of compressed air of pressure 200 [KPa] at a water depth of about 50 cm. Then, air was uniformly discharged from all the holes, but sometimes failed to be discharged from some of the holes. Additionally, when the flow rate of compressed air was reduced to 5 [Nm³/Hr], air failed to be discharged from a significantly large number of holes. When the flow rate of compressed air was reduced to 3 [Nm³/Hr], no air was discharged from some of the holes.

Example 1

Six thousand hollow fiber precision membranes as described in Example 3 of WO02/070115 were prepared. The openings at the opposite ends of each of the membranes were sealed to form a bundle. Furthermore, two polyvinyl chloride pipes were prepared which had an outer diameter of 22 mm, an approximate inner diameter of 16 mm, and the same length as that of each of the hollow fiber membranes. The pipes were used as communication pipes. The hollow fiber membrane bundle and the two pipes were housed at a time in a module case made up of a cylindrical pipe with an outer diameter of 165 mm and an approximate inner diameter of 153 mm. The module case was made of an ABS resin. Then, the hollow member shown in FIG. 3 and which was the same as that used in Experiment Example 5 was inserted into the vicinity of one end of the module case, with the other end remaining intact. An adhesion jig for centrifugal casting was attached to each of the opposite ends.

Then, centrifugal casting was performed to adhesively fix together the hollow fiber membranes, the hollow member, and the module case on one side and the hollow fiber membranes, the pipe, and the module case on the other side by means of filling of a two-component urethane resin. At this time, the amount of resin filled was adjusted so as not to block the holes in the top surface of the hollow member with the resin. After the resin was sufficiently cured, the opposite adhesion jigs were removed, and the opposite ends were cut at appropriate positions. This exposed, on one side, the end surface in which the hollow portions of the hollow fiber membranes, the communication pipe, and the supply source pipe portion of the raw-water distributive supply portion were open, and on the other side, the end surface in which the hollow portions of the hollow fiber membranes and the communication pipe were open. Thus, a hollow fiber membrane module was obtained. A first cap similar to that shown in FIG. 5 was attached to the former end surface via an O ring. Moreover, a metal cap fastening jig was installed on and fastened to the former end surface like a nut. Thus, the module end surface and the cap were sealed in a liquid-tight manner. Furthermore, a second cap similar to that shown in FIG. 1 was attached to the latter end surface via an O ring. A metal cap fastening jig was fastened to the latter end surface like a nut for liquid-tight sealing. Thus, a hollow fiber membrane module assembly was obtained.

In the hollow fiber membrane module assembly, the filling rate at which the hollow fiber membranes were filled into the module case (the ratio of the outer diameter-based sectional area of the hollow fiber membranes to the intra-pipe sectional area excluding the outer diameter-based sectional area of the communication pipe) was 40%, outer surface-based membrane area was 46 m², and effective membrane length was 2 m. The water permeation performance of the hollow fiber membrane module was measured using, as raw water, ion-exchanged water allowed to permeate an ultrafiltration membrane module with a nominal molecular cutoff of 6,000 daltons. The results are shown in Table 1.

Then, the hollow fiber membrane module assembly was mounted in an evaluation apparatus. The hollow fiber membrane module assembly was then evaluated for filtration stability using, as raw water, river surface stream water having a turbidity of 0.4 to 3.1 degrees, an average turbidity of 1.2 degrees, a TOC of 0.32 to 1.65 mg/L, and an average TOC of a 0.55 mg/L. First, filtration was performed at a set water sample amount of 2.2 m/day {the set water sample amount (m/day) was determined by dividing filtration flow rate (m³/day) by extra-membrane surface area (m²)} for 29 minutes. Then, aeration back washing was performed for 60 seconds. The back washing flow rate was the same as the set filtrate sample rate, 2.2 m/day (extra-membrane surface area-based value). The amount of air from the raw-water distributive supply portion at the bottom of the module was 5 Nm³/Hr. This cycle was continued. Then, a low inter-membrane differential pressure of about 40 KPa was achieved for 10 days or longer, indicating a stable operation result. Since stable filtration was possible for 10 days or longer, the cycle was continued with the set water sample amount and the back washing flow rate increased to 2.7 m/day. Then, in spite of an increase in inter-membrane differential pressure from 50 to 60 KPa, a stable operation was possible for further 10 days or longer. Thereafter, the evaluation was suspended and then resumed with the set water sample amount and the back washing flow rate maintained at 2.7 m/day. Then, a stable operation was possible for further 10 days or longer with the inter-membrane differential pressure maintained at 50 to 60 KPa. The results are shown in FIG. 15.

Example 2

Six thousand hollow fiber precision membranes as described in Example 3 of WO02/070115 were prepared and bundled. The openings at the opposite ends of each of the membranes were sealed. Then, an irregular-shaped double pipe made of polyvinyl chloride was prepared. The irregular-shaped double pipe was shaped like a cylinder having an outer diameter of 165 mm and an approximate inner diameter of 153 mm. The irregular-shaped double pipe contained a permeated water communication portion having a spindle-shaped opening with a cross section at right angles to the length direction which cross section has a major diameter of 56 mm and a minor diameter of 11 mm. A 6.5S ferule joint was provided on the outer circumference of each of the opposite ends of the double pipe. The hollow fiber membrane bundle was housed in the double pipe at a time. One hundred and twenty holes of diameter 6 mm were open in the side surface of a head portion at one end of the irregular-shaped double pipe. The holes connect the exterior of the side surface to the space in which the hollow fiber membranes were housed. Furthermore, the same hollow member as that used in Experiment Example 6 was inserted into the other end. An adhesion jig for centrifugal casting was attached to each of the opposite ends.

Then, centrifugal casting was performed to adhesively fix together the hollow fiber membranes and the module case on one side and the hollow fiber membranes, the module case, and the hollow member on the other side by means of filling and solidification of a two-component urethane resin. After the resin was sufficiently cured, the opposite adhesion jigs were removed, and the opposite ends were cut at appropriate positions. This exposed, on one side, the end surface in which the hollow portions of the hollow fiber membranes, the permeated water communication portion, and the supply source pipe portion were open, and on the other side, the end surface in which the hollow portions of the hollow fiber membranes and the permeated water communication portion were open. Thus, a hollow fiber membrane module was obtained. The first cap shown in FIG. 6 was attached and clamped to one end of the hollow fiber membrane module via an O ring. Thus, the module end surface and the cap were sealed in a liquid-tight manner. Furthermore, a cap similar to the cap 10 shown in FIG. 1 was attached and similarly clamped to the other end surface via an O ring. Besides this, the concentrated water holding chamber 12 shown in FIG. 11 and including the concentrated water discharge nozzle was fixed to the hollow fiber membrane module via an O ring. Thus, a hollow fiber membrane module assembly was obtained.

In the hollow fiber membrane module assembly, the filling rate of the hollow fiber membranes (the ratio of the outer diameter-based sectional area of the hollow fiber membranes to the intra-pipe sectional area excluding the outer diameter-based sectional area of the communication pipe) was 40%, the outer surface-based membrane area was 46 m$^2$, and the effective membrane length was 2 m. The permeated water communication portion, shaped like a spindle, had an inner sectional area of about 400 mm$^2$. The water permeation performance of the hollow fiber membrane module was measured using, as raw water, ion-exchanged water allowed to permeate an ultrafiltration membrane module with a nominal molecular cutoff of 6,000 daltons. The results are shown in Table 1.

Example 3

Fifty-eight hundred hollow fiber precision membranes as described in Example 1 of WO07/043553 were prepared. The openings at the opposite ends of each of the membranes were sealed to form a bundle. A hollow fiber membrane module was produced which had the same structure as that in Example 1 except for the type of the hollow fiber ultrafiltration membrane, the inner/outer diameter of the membrane, and the number of hollow fiber membranes filled. The first and second caps were attached to the respective ends of the hollow fiber membrane module to form a hollow fiber membrane module assembly.

In the hollow fiber membrane module assembly, the filling rate at which the hollow fiber membranes were filled into the module case was 40%, the outer surface-based membrane area was 46 m$^2$, and the effective membrane length was 2 m. The water permeation performance of the hollow fiber membrane module was measured using, as raw water, ion-exchanged water allowed to permeate an ultrafiltration membrane module with a nominal molecular cutoff of 6,000 daltons. The results are shown in Table 1.

Then, the hollow fiber membrane module assembly was mounted in an evaluation apparatus. The hollow fiber membrane module assembly was then evaluated for filtration stability using, as raw water, river surface stream water having a turbidity of 0.5 to 9.7 degrees, an average turbidity of 1.5 degrees, a TOC of 0.35 to 1.83 mg/L, and an average TOC of a 0.58 mg/L. First, filtration was performed at a set water sample amount of 2.7 m/day {the set water sample amount (m/day) was determined by dividing the filtration flow rate (m$^3$/day) by the extra-membrane surface area (m$^2$)} for 29 minutes. Then, aeration back washing was performed for 60 seconds. The back washing flow rate was the same as the set filtrate sample rate, 2.7 m/day (extra-membrane surface area-based value). The amount of air from the raw-water distributive supply portion at the bottom of the module was 5 Nm$^3$/Hr. This cycle was continued. Then, a low inter-membrane differential pressure of about 50 KPa was achieved for 20 days, indicating a stable operation result. Since stable filtration was possible for 20 days, the cycle was continued with the set water sample amount and the back washing flow rate increased to 3.3 m/day. Then, in spite of an increase in inter-membrane differential pressure from 60 to 70 KPa, a stable operation was possible for further 20 days or longer. The results are shown in FIG. 18.

Example 4

Seventeen hundred hollow fiber precision membranes as described in Example 2 of WO07/043553 were prepared. The openings at the opposite ends of each of the membranes were sealed to form a bundle. Furthermore, one polyvinyl chloride pipe was prepared which had an outer diameter of 18 mm, an approximate inner diameter of 13 mm, and the same length as that of each of the hollow fiber membranes. The opposite ends of the pipe were sealed. The pipe was used as a communication pipe. The hollow fiber membrane bundle and the pipe were housed at a time in a module case made up of a cylindrical pipe with an outer diameter of 89 mm and an approximate inner diameter of 83 mm. The module case was made of polyvinyl chloride. Then, the hollow member shown in FIG. 3 and which was the same as that used in Experiment Example 5 was inserted into the vicinity of one end of the module case (the size of the module case was different from that in Examples 1 and 3), with the other end remaining intact. An adhesion jig for centrifugal casting was attached to each of the opposite ends.

Then, centrifugal casting was performed to adhesively fix together the hollow fiber membranes, the pipe, the hollow member, and the module case on one side and the hollow fiber membranes, the pipe, and the module case on the other side by means of filling of a two-component urethane resin. At this time, a mixture of equal amounts (volume ratio) of commercially available paper clay and ethylcellulose was molded into cylindrical pieces, which were then inserted into the introduction holes. The cylindrical pieces were thus adhesively fixed.

After the resin was sufficiently cured, the opposite adhesion jigs were removed, and the opposite ends were cut at appropriate positions. This exposed, on one side, the end surface in which the hollow portions of the hollow fiber membranes, the communication pipe, and the supply source pipe portion of the raw-water distributive supply portion were open, and on the other side, the end surface in which the hollow portions of the hollow fiber membranes and the communication pipe were open. Thus, a hollow fiber membrane module was obtained. A first cap similar to that shown in FIG. 5 was attached to the former end surface via an O ring. Moreover, a metal cap fastening jig was installed on and fastened to the former end surface like a nut. Thus, the module end surface and the cap were sealed in a liquid-tight manner. Furthermore, a second cap similar to the cap 10 shown in FIG. 1 was attached to the latter end surface via an O ring. A metal cap fastening jig was similarly used and fastened to the latter end surface like a nut for liquid-tight sealing. A 50-mass % ethanol water solution was filled into the resulting hollow fiber membrane module assembly through the concentrated water discharge nozzle. The hollow fiber membrane module assembly was then left overnight to dissolve the ethylcellulose components of the molding articles made of the mixture of paper clay and ethylcellulose and blocking the introduction holes. After the hollow fiber membrane module assembly was left overnight, back washing was performed using ion-exchanged water from the first cap side under a pressure of 100 KPa. Thus, remaining paper clay components were dispersed and discharged to ensure a raw-water supply path leading from the raw-water supply source pipe to the introduction holes via the supply branching portion.

In the hollow fiber membrane module assembly, the filling rate at which the hollow fiber membranes are filled in the module case (the ratio of the outer diameter-based sectional area of the hollow fiber membranes to the intra-pipe sectional area excluding the outer diameter-based sectional area of the communication pipe) was 40%, the outer surface-based membrane area was 13 $m^2$, and the effective membrane length was 2 m. The water permeation performance of the hollow fiber membrane module was measured using, as raw water, ion-exchanged water allowed to permeate an ultrafiltration membrane module with a nominal molecular cutoff of 6,000 daltons. The results are shown in Table 1.

Then, the hollow fiber membrane module assembly was mounted in a laboratory evaluation apparatus (a closed evaluation apparatus that returns water overflowing a filtration tank and discharged water resulting from physical washing such as back washing, to a raw-water tank). A model liquid (a mixed solution of a humic acid and bentonite {for preparation, humic acid concentration: 100 mg/liter in term of TOC, bentonite concentration: 100 degrees in terms turbidity}) was used as raw water. Since turbidity components and TOC components are captured in the hollow fiber membrane bundle to reduce the turbidity of the raw water and the TOC concentration, the turbidity in the raw-water tank and the TOC were periodically measured. When each of the turbidity and the TOC became lower than 70% of the initial value thereof, a humic acid component and/or bentonite was added to the raw water for evaluation. A set water sample amount of raw water was filtered at 2.8 m/day for nine minutes. Then, aeration back washing was performed for 60 seconds. The back washing flow rate was the same as the set water sample amount, 2.8 m/day. The flow rate of air from the raw-water distributive supply portion at the bottom of the module was 1.5 $Nm^3$/Hr. This cycle was continued. Then, a stable operation was achieved with an inter-membrane differential pressure of 40 to 60 KPa. The results are shown in FIG. 19.

Comparative Example 1

The method described in Example 1 was similarly carried out from the beginning through the adhesive fixing process except for the following. The number of hollow fiber precision filtration membranes filled was 6,300. For one side of the hollow fiber microfiltration membranes, sealing of the hollow portions of the membranes was avoided so that when the opposite ends of membranes were cut at the appropriate positions after solidification, the hollow portions were not open in the resulting cut surface. Instead of the hollow member, 24 hollow objects made of polyethylene and having an outer diameter of 11 mm as shown in FIG. 16 were arranged and adhesively fixed in the hollow fiber membrane bundle. No communication portion was provided. For the other side, the hollow portions of the hollow fiber membranes were sealed, and an adhesion jig was attached to the corresponding end.

Then, centrifugal casting was performed to adhesively fix together the hollow fiber membranes, the module case, and the hollow objects at one end of the module and the hollow fiber membranes and the module case at the other end by means of filling and solidification of a two-component urethane resin. At this time, the amount of resin filled was adjusted so as not to bury the vicinity of the tip of each of the hollow objects in the resin. After the resin was sufficiently cured, the opposite adhesion jigs were removed, and the opposite ends were cut at appropriate positions to expose the opening surfaces. Moreover, the 24 hollow objects were removed from the one end. Thus, one end had the end surface in which the hollow portions of the hollow fiber membranes and the 24 raw-water or air introduction ports for raw-water supply were open. The other end had the end surface in which the hollow portions of the hollow fiber membranes were open. Thus, a comparative module was obtained. A cap similar to the second cap 10 shown in FIG. 1 was attached, via an O ring, to and fastened to each of the opposite ends of comparative module like a nut. Thus, a comparative module assembly was obtained.

In the comparative module assembly, permeated water was sampled only from one side of the hollow fiber membranes. The filling rate of the hollow fiber membranes was 40%. The water permeation performance of the comparative module assembly was measured using, as raw water, ion-exchanged water allowed to permeate an ultrafiltration membrane module with a nominal molecular cutoff of 6,000 daltons. The results are shown in Table 1.

The resulting comparative module assembly was mounted in the same evaluation apparatus as that in Example 1 and concurrently subjected to filtration stability tests. First, filtration was performed at a set water sample amount of 2.2 m/day {the set water sample amount (m/day) was determined by dividing the filtration flow rate (m³/day) by the extra-membrane surface area (m²)} for 29 minutes. Then, aeration back washing was performed for 60 seconds. The back washing flow rate was the same as the set filtrate sample rate, 2.2 m/day (extra-membrane surface area-based value). The amount of air from the raw-water and air introduction port at the bottom of the module was 5 Nm³/Hr. This cycle was continued. Then, a stable operation was possible for 10 days or longer, but the required inter-membrane differential pressure was about 80 KPa, which is double the inter-membrane differential pressure in Example 1. In spite of the relatively high inter-membrane differential pressure of about 80 KPa, the stable operation result was obtained. Thus, the cycle was continued again with the set water sample amount and the back washing flow rate increased to 2.7 m/day. Then, a stable operation was possible for 10 days or longer, but the required inter-membrane differential pressure was 80 to 100 KPa, which is 1.6 times as high as the inter-membrane differential pressure in Example 1.

The evaluation was suspended and then resumed with the set water sample amount and the back washing flow rate remaining at 2.7 m/day. A stable operation was still possible for 10 days or longer. However, as in the case before the suspension, the inter-membrane differential pressure was 70 to 90 KPa, which is about 1.6 times as high as the inter-membrane differential pressure in Example 1. The results are shown in FIG. 15.

Furthermore, when the set water sample amount was 2.2 m/D and power consumption in Comparative Example 1 was defined as 100, the power consumption in Example 1 was 59. Additionally, when the set water sample amount was 2.7 m/D and the power consumption in Comparative Example 1 was defined as 100, the power consumption in Example 1 was 71. This means that in Example 1, at each set water sample amount, almost the same amount of permeated water was successfully sampled with required power consumption accounting for 59 or 71% of that in the conventional art.

Comparative Example 2

One polyvinyl chloride pipe was prepared which had an outer diameter of 32 mm, an approximate inner diameter of 25 mm, and a length of 2 m. The pipe included a large number of circular holes drilled therein and having a diameter of 2 mm, and one side of the pipe was sealed. The pipe was used as a raw-water supply pipe. Furthermore, as in the case of Example 1, two polyvinyl chloride pipes were prepared which had an outer diameter of 22 mm, an approximate inner diameter of 16 mm, and the same length as that of each hollow fiber membrane and both sides of which were sealed. The two pipes were used as communication pipes. The three pipes and fifty-six hundred hollow fiber microfiltration membranes as described in Example 2 of WO07/043553, which were used in Example 3 were prepared, and the opposite ends of each of the membranes were sealed to form a bundle. The hollow fiber microfiltration membranes and the above-described three pipes were assembled together to produce a hollow fiber membrane module as in the case of Examples 1 and 3. At this time, the pipe having an outer diameter of 32 mm and used as a raw-water supply pipe was located in the center of the module case. A first cap was attached, via an O ring, to the end source in which the raw-water supply pipe of the hollow fiber membrane module was open. A second cap was attached, via an O ring, to the end source in which the raw-water supply pipe of the hollow fiber membrane module was sealed. Each of the first and second caps was tightened using a metal fastening jig. Thus, a hollow fiber membrane module assembly in the present comparative example was obtained.

The comparative module assembly allowed permeated water to be sampled through the opposite ends of the hollow fiber membranes. However, raw water is fed from the raw-water supply pipe through a countless number of holes open all along the longitudinal direction of each of the hollow fiber membranes, from the center to outer circumference of the bundle in a direction perpendicular to the hollow fiber membranes and the hollow fiber membrane bundle.

The filling rate of the hollow fiber membranes was 41%. As in the case of Example 3, the water permeation performance of the comparative module assembly was measured using, as raw water, ion-exchanged water allowed to permeate an ultrafiltration membrane module with a nominal molecular cutoff of 6,000 daltons. The results are shown in Table 1.

Then, the comparative module assembly was mounted in the same evaluation apparatus as that in Example 3 and concurrently subjected to filtration stability tests. First, filtration was performed at a set water sample amount of 2.7 m/day {the set water sample amount (m/day) was determined by dividing the filtration flow rate (m³/day) by the extra-membrane surface area (m²)} for 29 minutes. Then, aeration back washing was performed for 60 seconds. The back washing flow rate was the same as the set filtrate sample rate, 2.7 m/day (extra-membrane surface area-based value). The amount of air from the raw-water and air introduction port at the bottom of the module was 5 Nm³/Hr. This cycle was continued. Then, the inter-membrane differential pressure was stable at 55 KPa during the first through fifth days of the evaluation but then started to increase. On the 20th day of the evaluation, the inter-membrane differential pressure increased up to 110 KPa. Thus, in Example 3, an evaluation with a set water sample amount of 3.3 m/day was suspended. The comparative hollow fiber membrane module was disassembled and checked for accumulation of turbid components in the hollow fiber membrane bundle. Then, there were not many turbid components in the outer circumferential portion of the hollow fiber membrane bundle. In contrast, many turbid components are closely deposited near the center of the bundle, corresponding to the raw-water supply side.

Comparative Example 3

The method described in Example 4 was similarly carried out from the beginning through the adhesive fixing process except for the following. The number of hollow fiber precision filtration membranes filled was 1,800. For one side of the hollow fiber microfiltration membranes, sealing of the hollow portions of the membranes was avoided so that when the opposite ends of membranes were cut at the appropriate positions after solidification, the hollow portions were not open in the resulting cut surface. Instead of the hollow member, 5 hollow objects made of polyethylene and having an outer diameter of 11 mm as shown in FIG. 16 were arranged and adhesively fixed in the hollow fiber membrane bundle. No communication portion was installed. For the other side, the hollow portions of the hollow fiber membranes were sealed, and an adhesion jig was attached to the corresponding end.

Then, centrifugal casting was performed to adhesively fix together the hollow fiber membranes, the module case, and the hollow objects at one end of the module and the hollow fiber membranes and the module case at the other end by means of filling and solidification of a two-component urethane resin. At this time, the amount of resin filled was adjusted so as not to bury the vicinity of the tip of each of the hollow objects in the resin. After the resin was sufficiently cured, the opposite adhesion jigs were removed, and the opposite ends were cut at appropriate positions to expose the opening surfaces. Moreover, the 5 hollow objects were removed from the one end. Thus, one end had the end surface in which the hollow portions of the hollow fiber membranes and the 5 raw-water or air introduction ports for raw-water supply were open. The other end had the end surface in which the hollow portions of the hollow fiber membranes were open. Thus, a comparative module was obtained. A cap similar to the second cap 10 shown in FIG. 1 was attached and fastened to each of the opposite ends of comparative module like a nut as in the case of Example 4. Thus, a comparative module assembly was obtained.

In the comparative module assembly, permeated water was sampled only from one side of the hollow fiber membranes. The filling rate of the hollow fiber membranes was 41%. The water permeation performance of the comparative module assembly was measured using, as raw water, ion-exchanged water allowed to permeate an ultrafiltration membrane module with a nominal molecular cutoff of 6,000 daltons. The results are shown in Table 1.

Then, the comparative module assembly was mounted in a laboratory evaluation apparatus concurrently with the hollow fiber membrane module assembly in Example 4. A filtration stability evaluation operation was then performed. Then, a stable operation was possible with an inter-membrane differential pressure of 60 to 100 KPa. This indicates the inter-membrane differential pressure during the filtration operation was 1.5 times higher than that in Example 4.

TABLE 1

| (Unit) | Example 1 | Example 2 | Example 3 | Example 4 | Comparative Example 1 | Comparative Example 2 | Comparative Example 3 |
|---|---|---|---|---|---|---|---|
| Inter-membrane differential pressure KPa | 24.0 | 25.0 | 22.0 | 24.0 | 27.0 | 24.0 | 25.0 |
| Pure water flux $m^3$/Hr Mo 25° C. | 8.8 | 8.9 | 12.8 | 3.3 | 6.4 | 13.0 | 2.0 |
| Equivalent pure water flux $m^3$/Hr Mo 100 KPa 25° C. | 36.7 | 35.2 | 58.2 | 14.0 | 24.1 | 54.2 | 7.9 |

INDUSTRIAL APPLICABILITY

The hollow fiber membrane module and the assembly thereof according to the present invention can be used in various fields but are particularly preferably used in the fields of water treatment such as clarification of river water, lake water, river-bed water, or the like.

Figure 1:
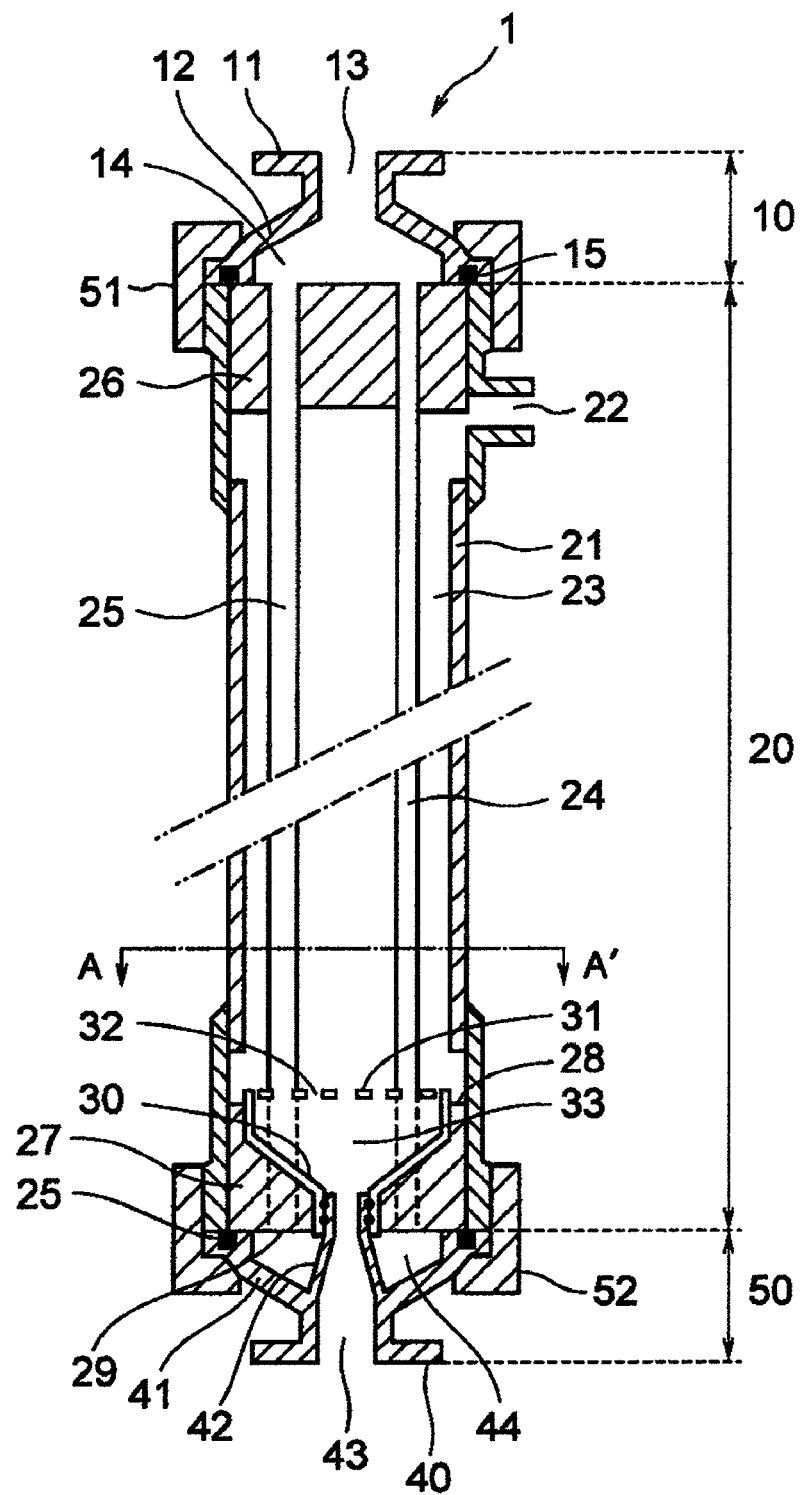
FIG. 1 is a schematic sectional view showing an example of the sectional structure of a hollow fiber membrane module assembly.
Figure 2:
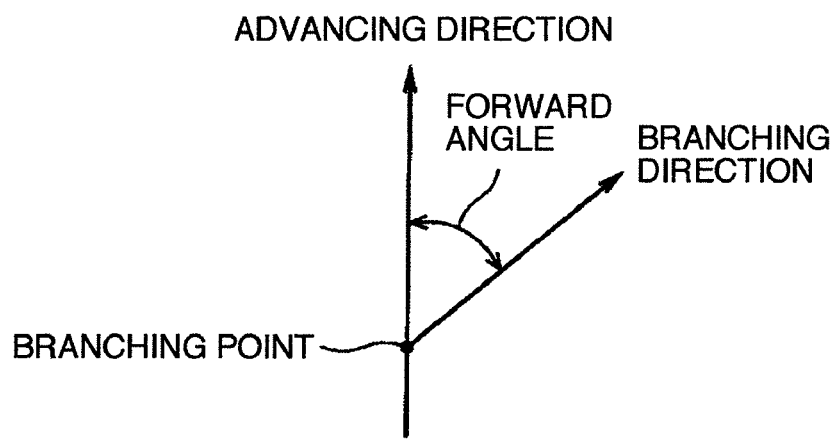
FIG. 2(1) is a diagram illustrating a forward angle, and FIG. 2(2) is a sectional view of the hollow fiber membrane module taken along line A-A' in FIG. 2(1)
Figure 2:
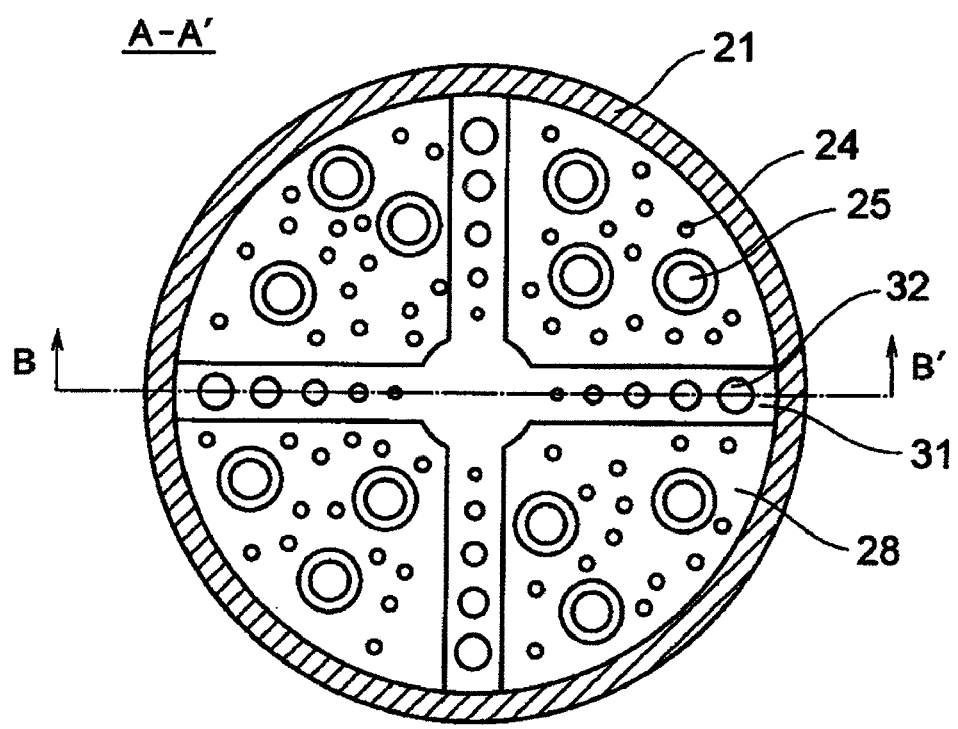
Figure 3:
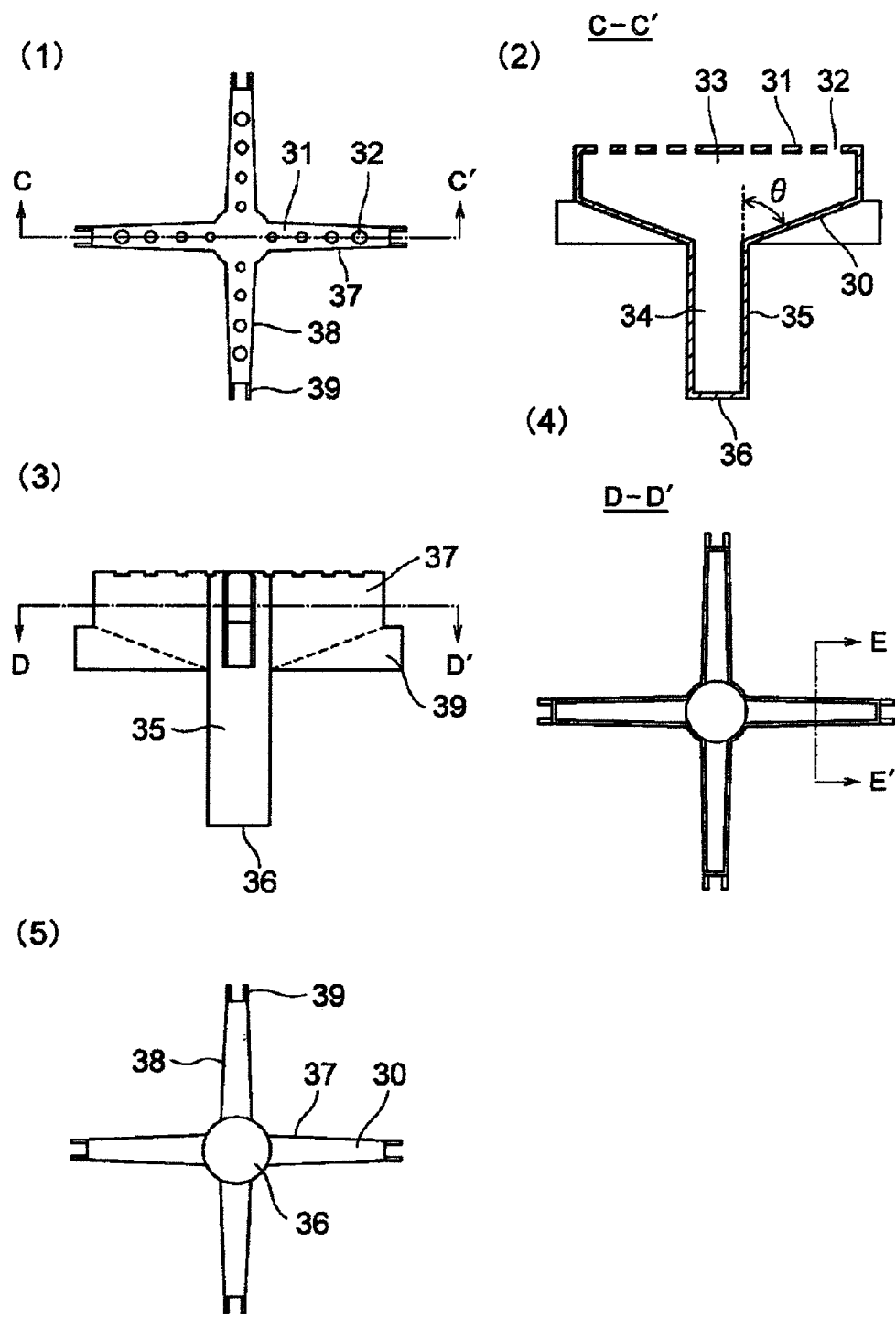
FIG. 3(1) is a top view schematically showing an example of a hollow member, FIG. 3(2) is a sectional view schematically showing the example of the hollow member and taken along line C-C' in FIG. 3(1), FIG. 3(3) is a front view schematically showing the example of the hollow member, FIG. 3(4) is a sectional view schematically showing the example of the hollow member and taken along line D-D' in FIG. 3(3), and FIG. 3(5) is a bottom view schematically showing the example of the hollow member.
Figure 4:
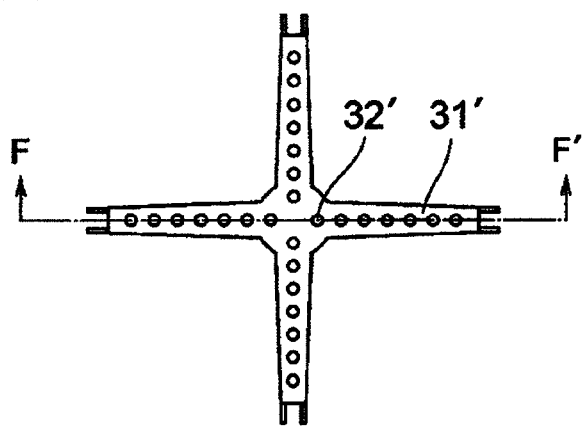
FIG. 4(1) is a top view schematically showing another example of the hollow member, FIG. 4(2) is a front view schematically showing the example of the hollow member, FIG. 4(3) is a sectional view schematically showing the example of the hollow member and taken along line F-F' in FIG. 4(1), and FIG. 4(4) is a bottom view schematically showing the example of the hollow member.
Figure 4:
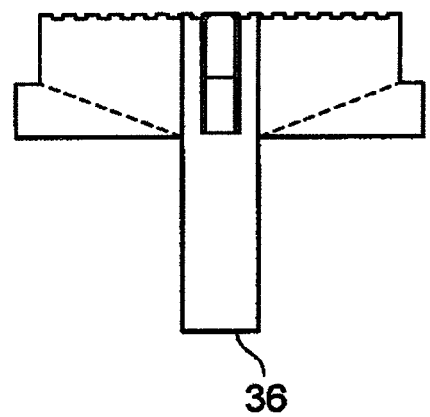
Figure 4:
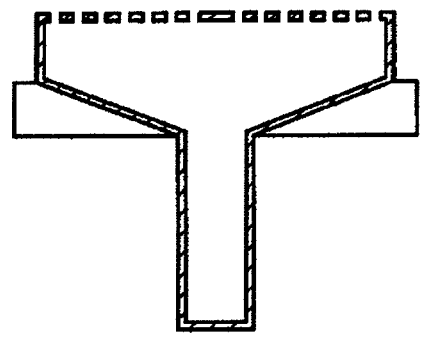
Figure 4:
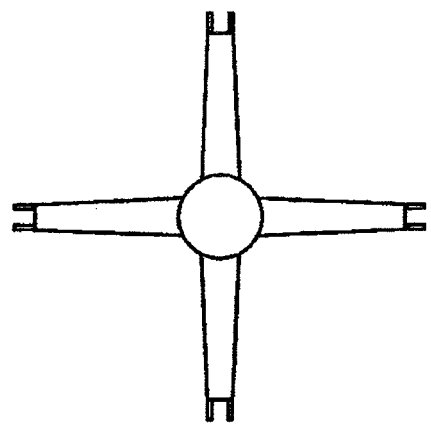
Figure 5:
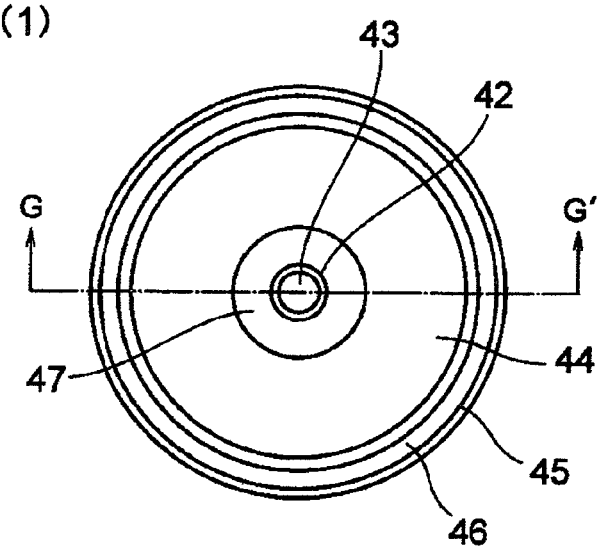
FIG. 5(1) is a top view schematically showing an example of a first cap, FIG. 5(2) is a front view schematically showing the example of the first cap, FIG. 5(3) is a sectional view schematically showing the example of the first cap and taken along line G-G' in FIG. 5(1), and FIG. 5(4) is a bottom view schematically showing the example of the first cap.
Figure 5:
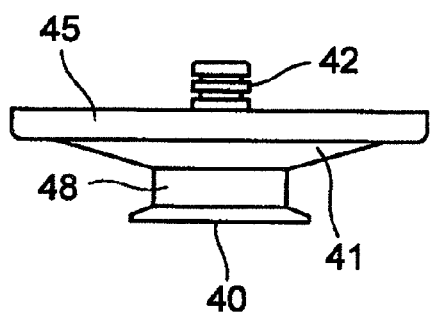
Figure 5:
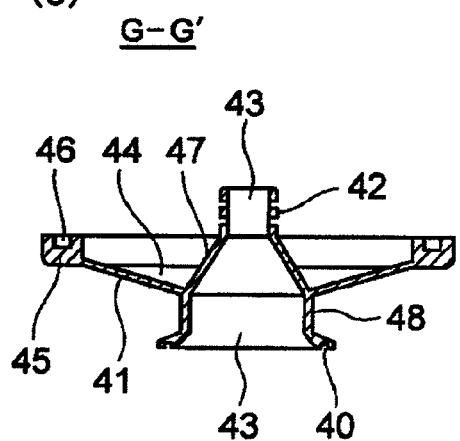
Figure 5:
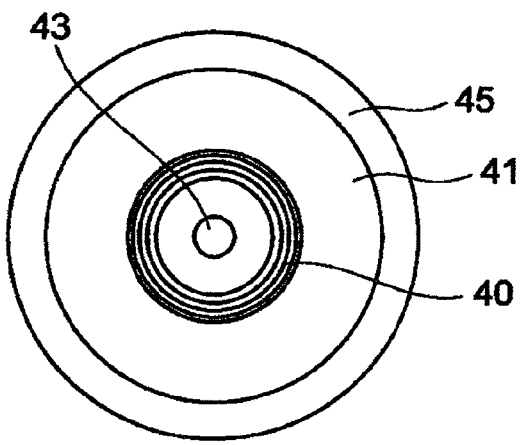
Figure 6:
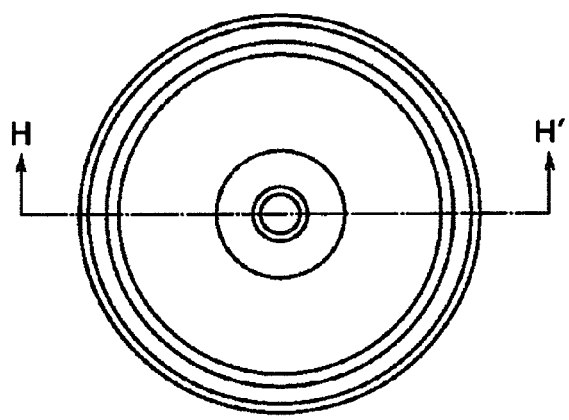
FIG. 6(1) is a top view schematically showing another example of a first cap, FIG. 6(2) is a front view schematically showing the example of the first cap, FIG. 6(3) is a sectional view schematically showing the example of the first cap and taken along line H-H' in FIG. 6(1), and FIG. 6(4) is a bottom view schematically showing the example of the first cap.
Figure 6:
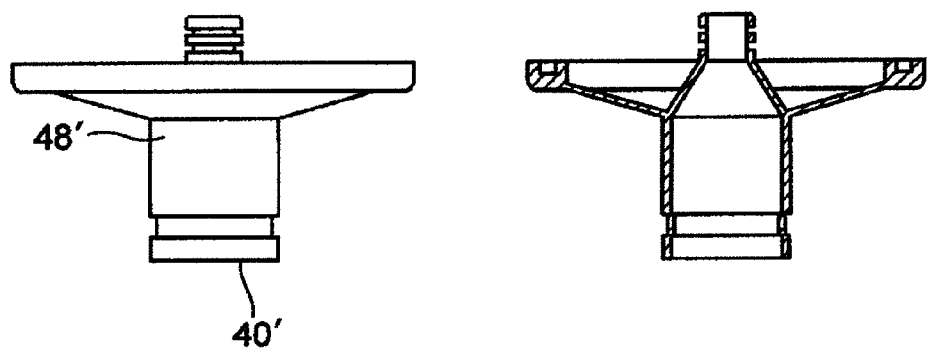
Figure 6:
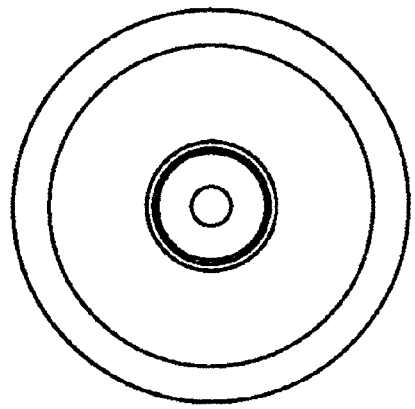
Figure 7:
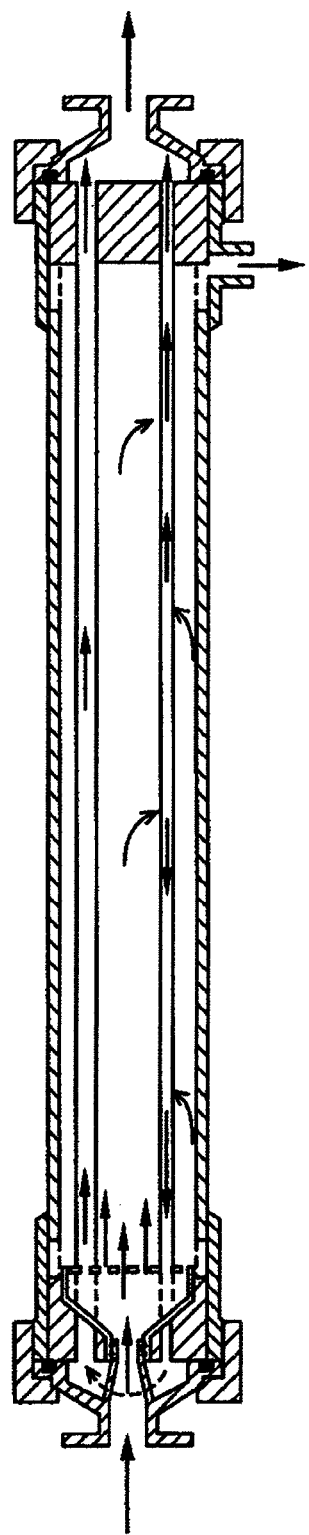
FIG. 7 is a schematic diagram showing a liquid flow during normal filtration using the hollow fiber membrane module assembly.
Figure 8:
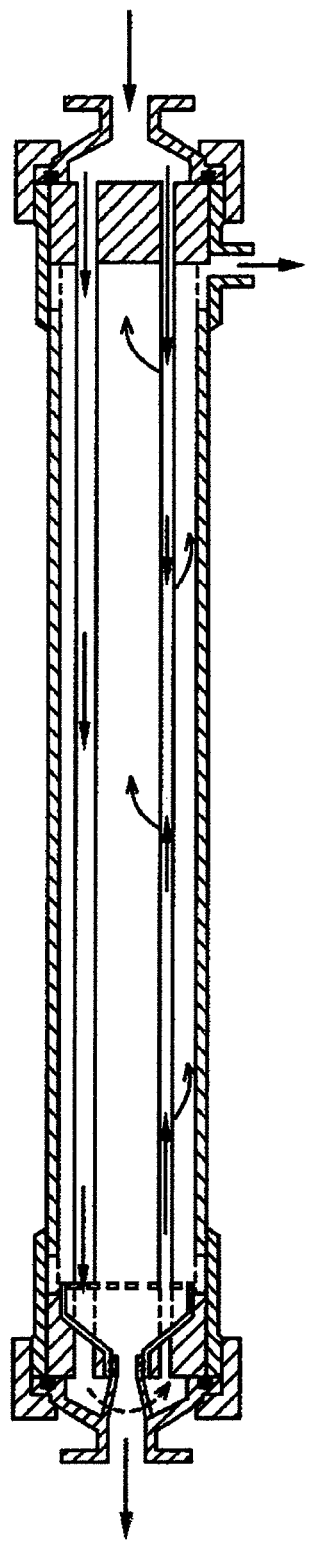
FIG. 8 is a schematic diagram showing a liquid flow during back washing using the hollow fiber membrane module assembly.
Figure 9:
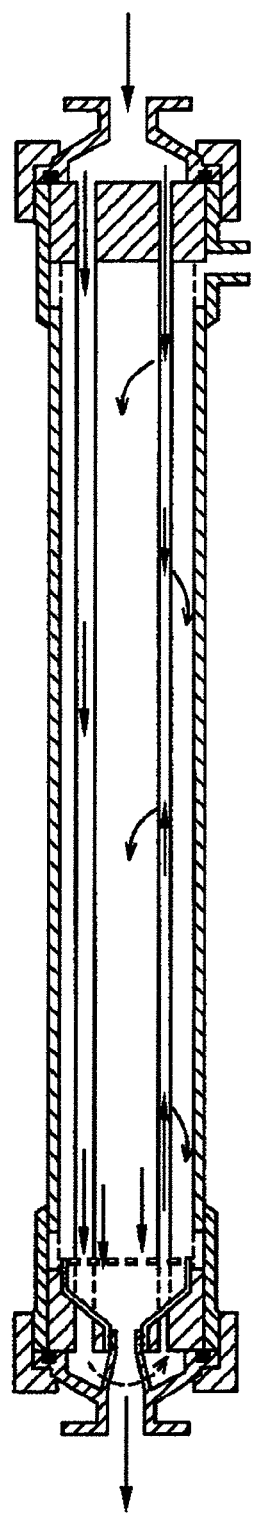
FIG. 9 is a schematic diagram showing a liquid flow in the case where raw water is discharged through a raw-water supply port 43 during back washing.
Figure 10:
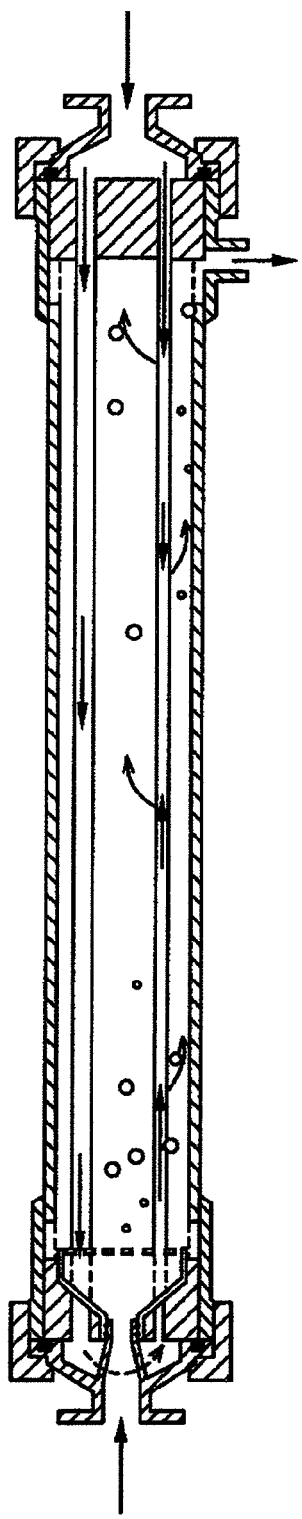
FIG. 10 is a schematic diagram showing a liquid flow during aeration back washing using the hollow fiber membrane module assembly.
Figure 11:
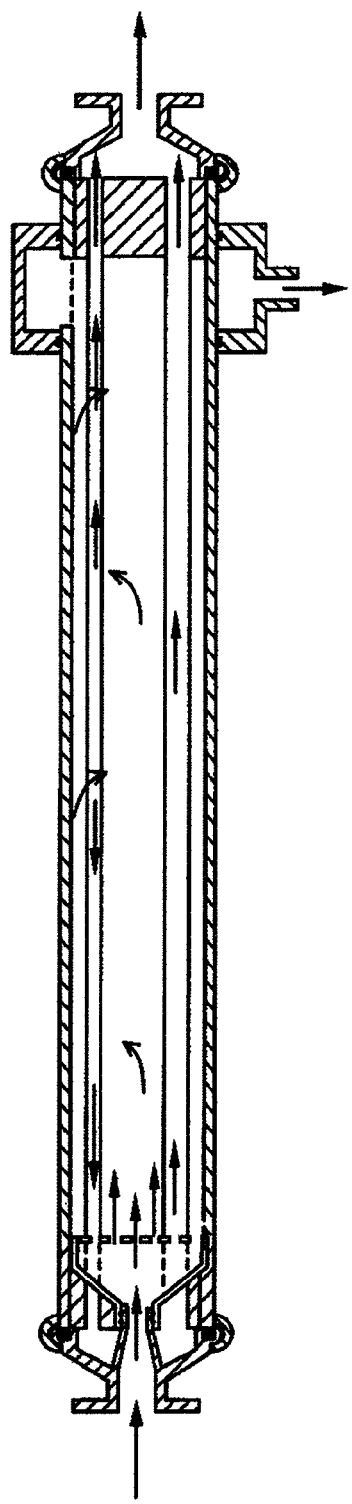
FIG. 11 is a schematic diagram showing a liquid flow during normal filtration in which an irregular-shaped double pipe is used as a module case.
Figure 12:
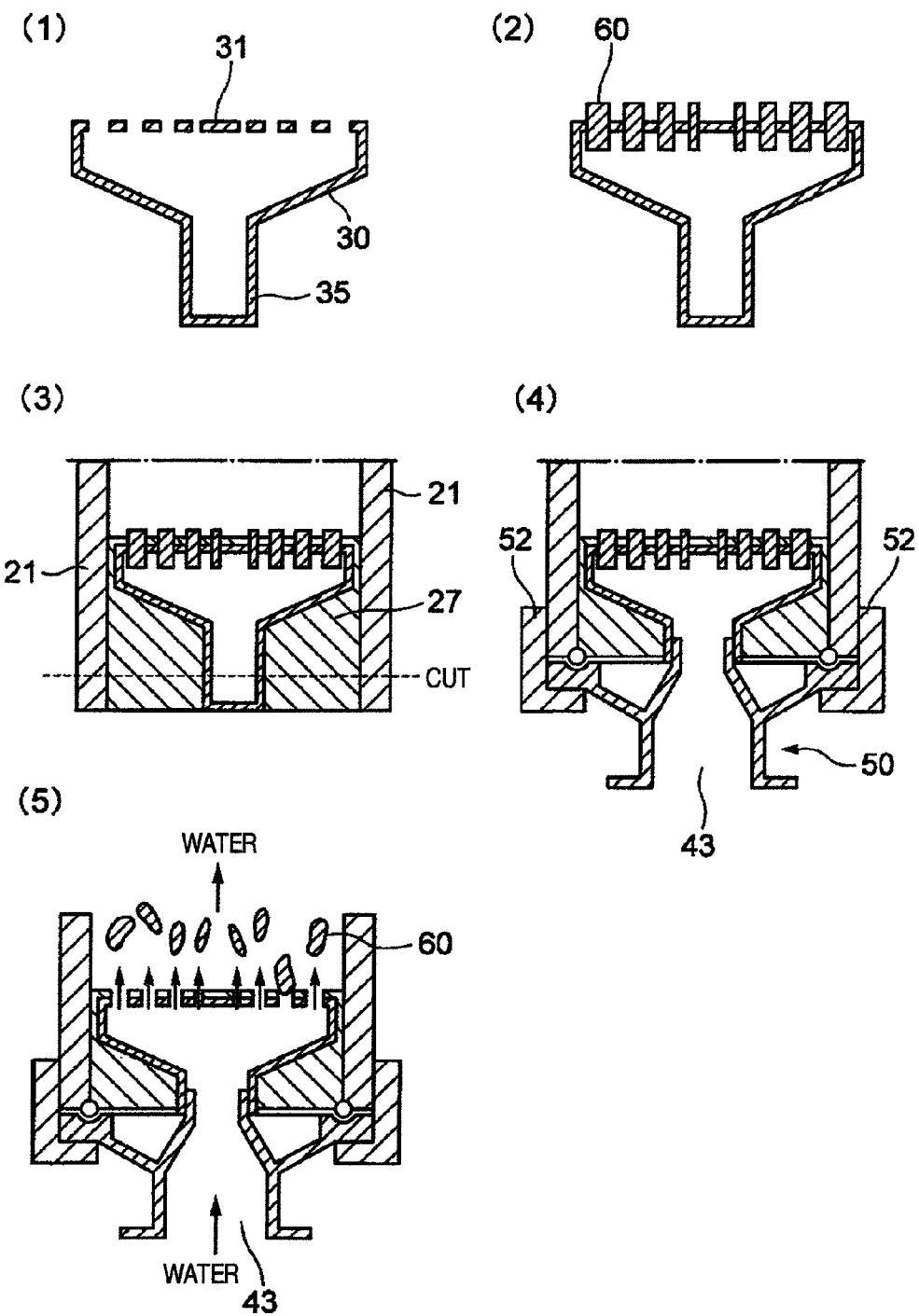
FIG. 12 is a series of diagrams illustrating a manufacture method allowing the heights of a bonded end surface and an inner end surface to be set equal.
Figure 13:
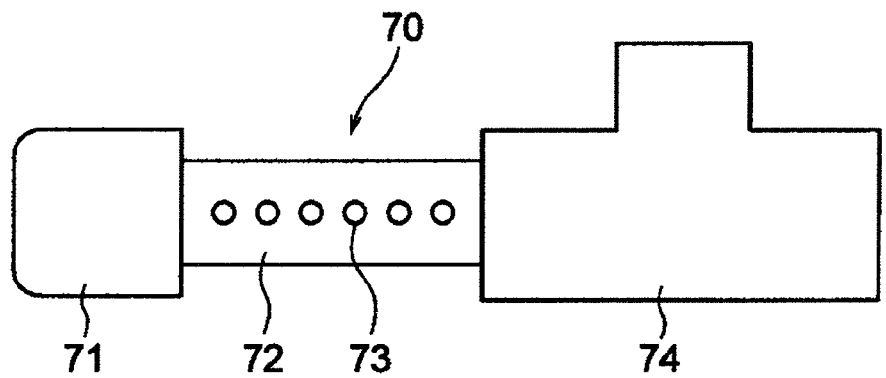
FIG. 13 is schematic diagrams of test parts used in Experiment Examples 1 to 4.
Figure 13:
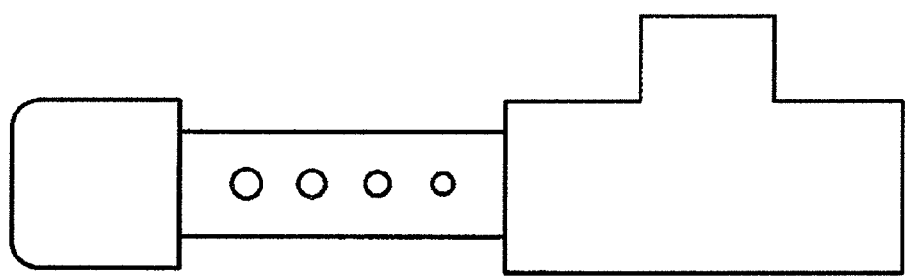
Figure 13:
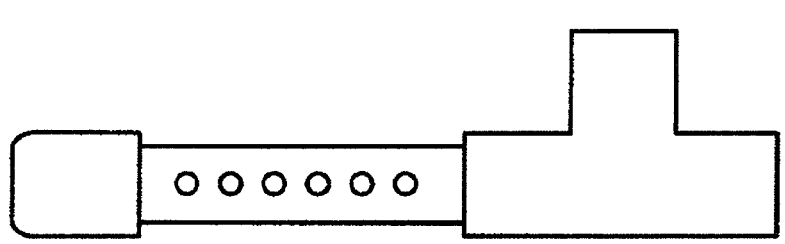
Figure 13:
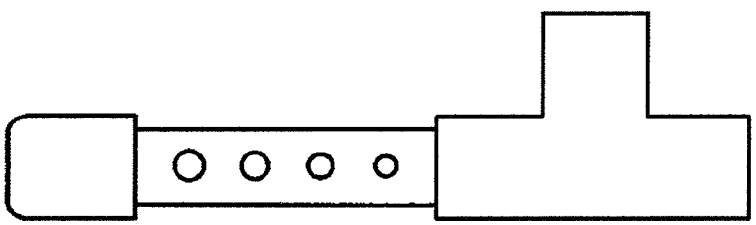
Figure 14:
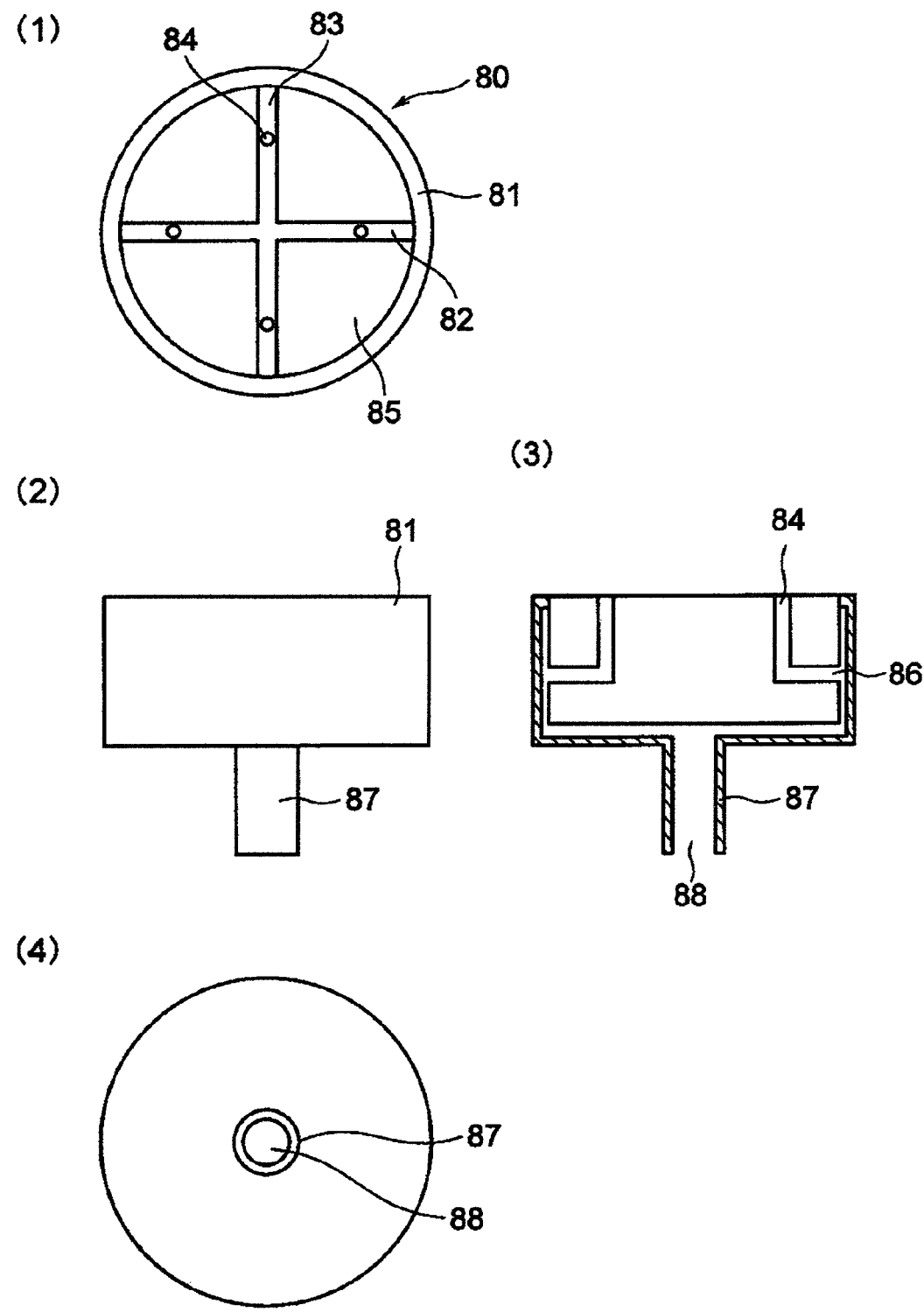
FIG. 14 is a schematic diagram of an element 80 used in Experiment Example 7.
Figure 15:
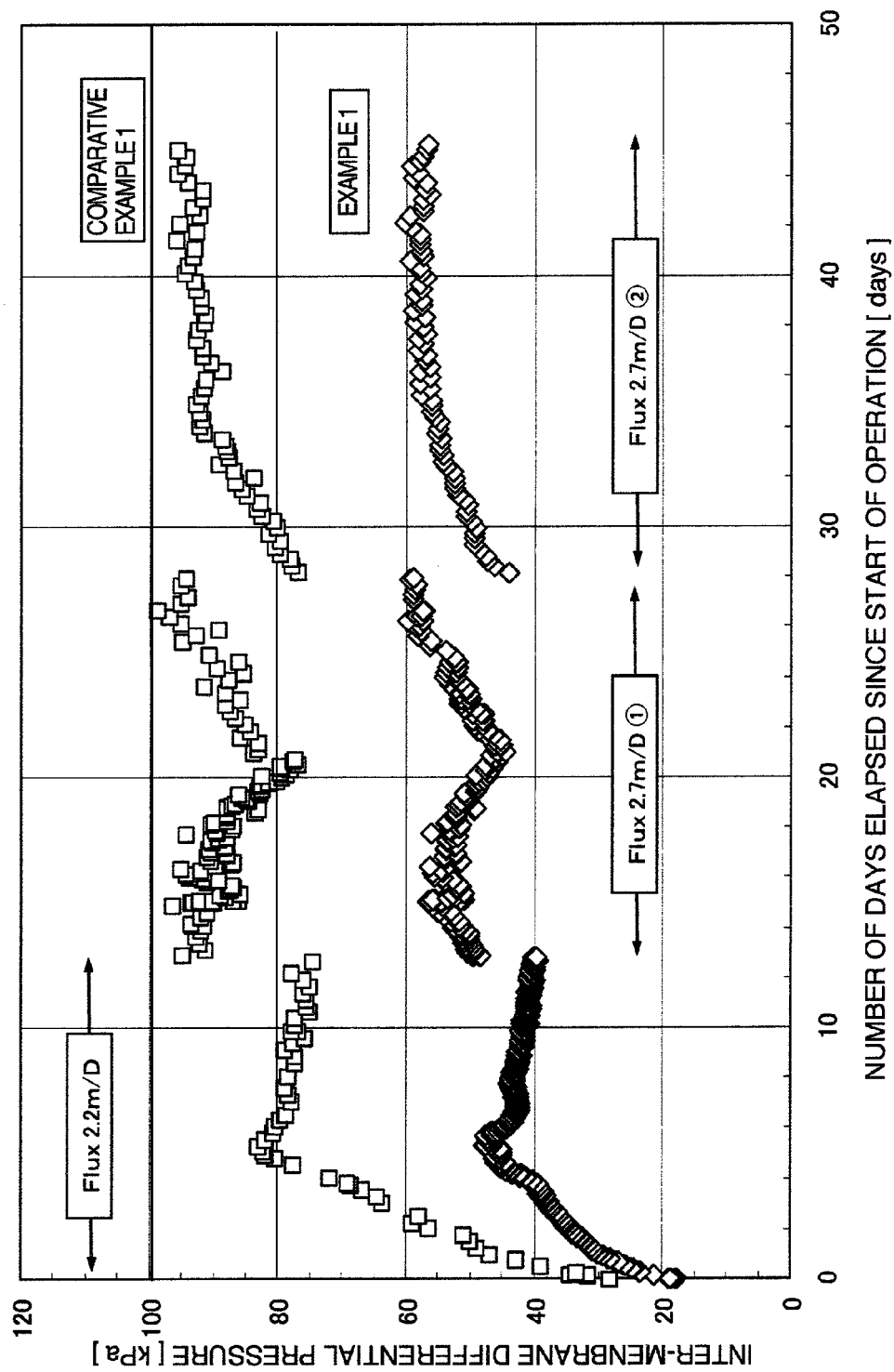
FIG. 15 is a graph showing the results of filtration stability tests in Example 1 and Comparative Example 1.
Figure 16:
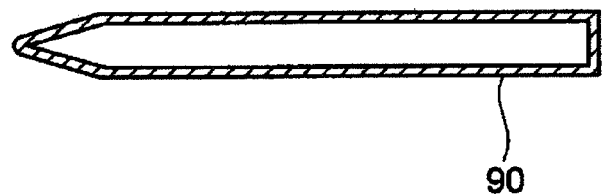
FIG. 16 is a schematic diagram of a hollow object used in Comparative Example 1.
Figure 17:
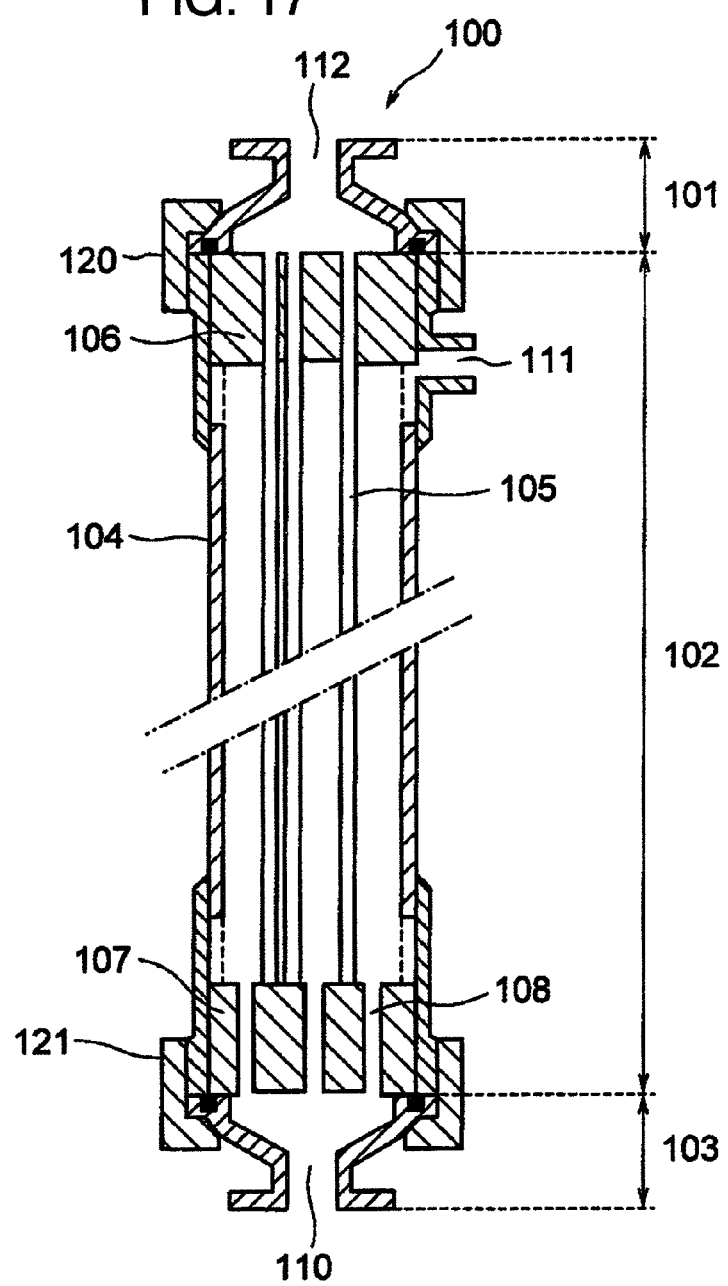
FIG. 17 is a schematic sectional view showing the structure of a conventional, comparative module assembly.
Figure 18:
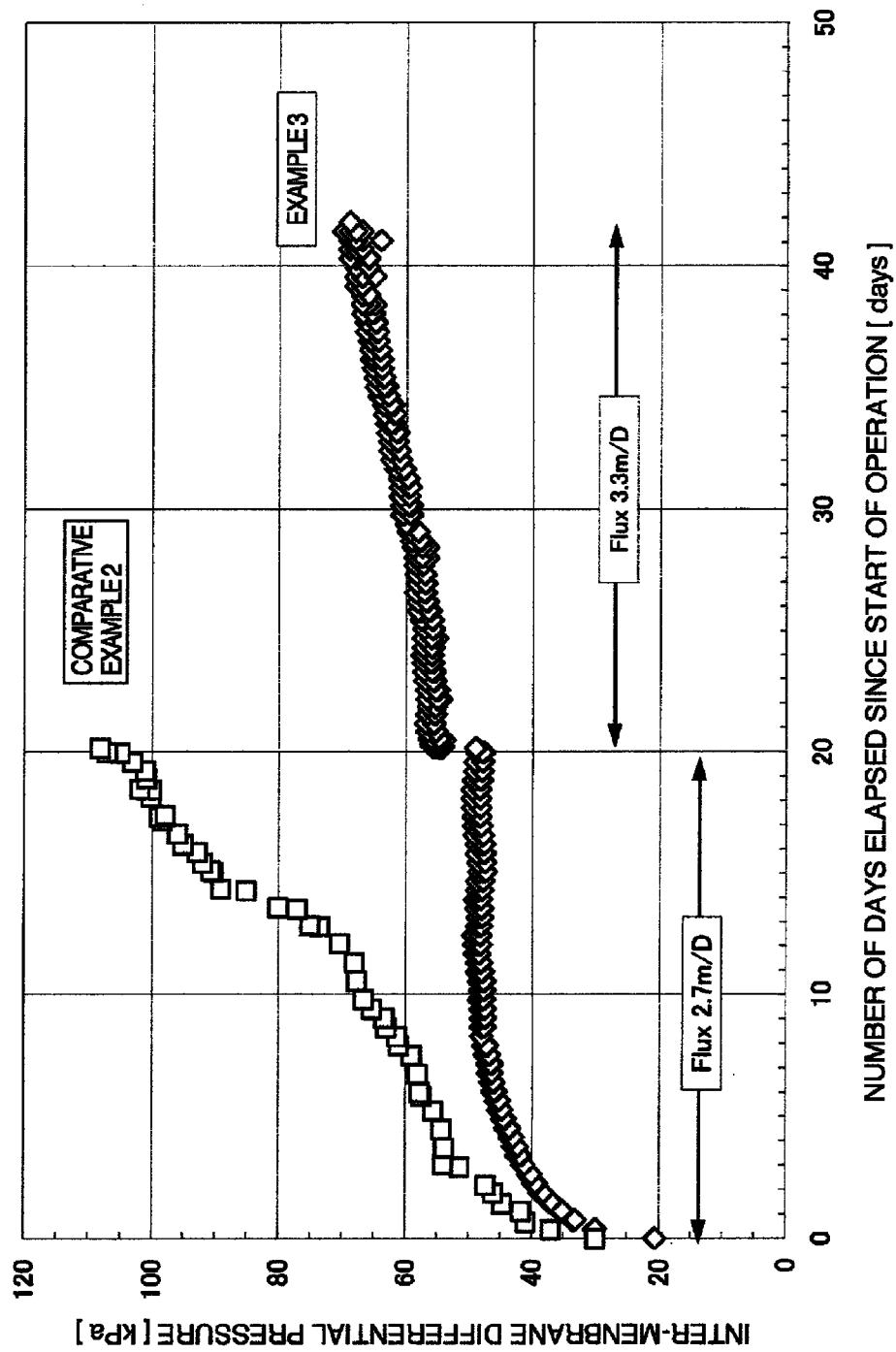
FIG. 18 is a graph showing the results of filtration stability tests in Example 3 and Comparative Example 2.
Figure 19:
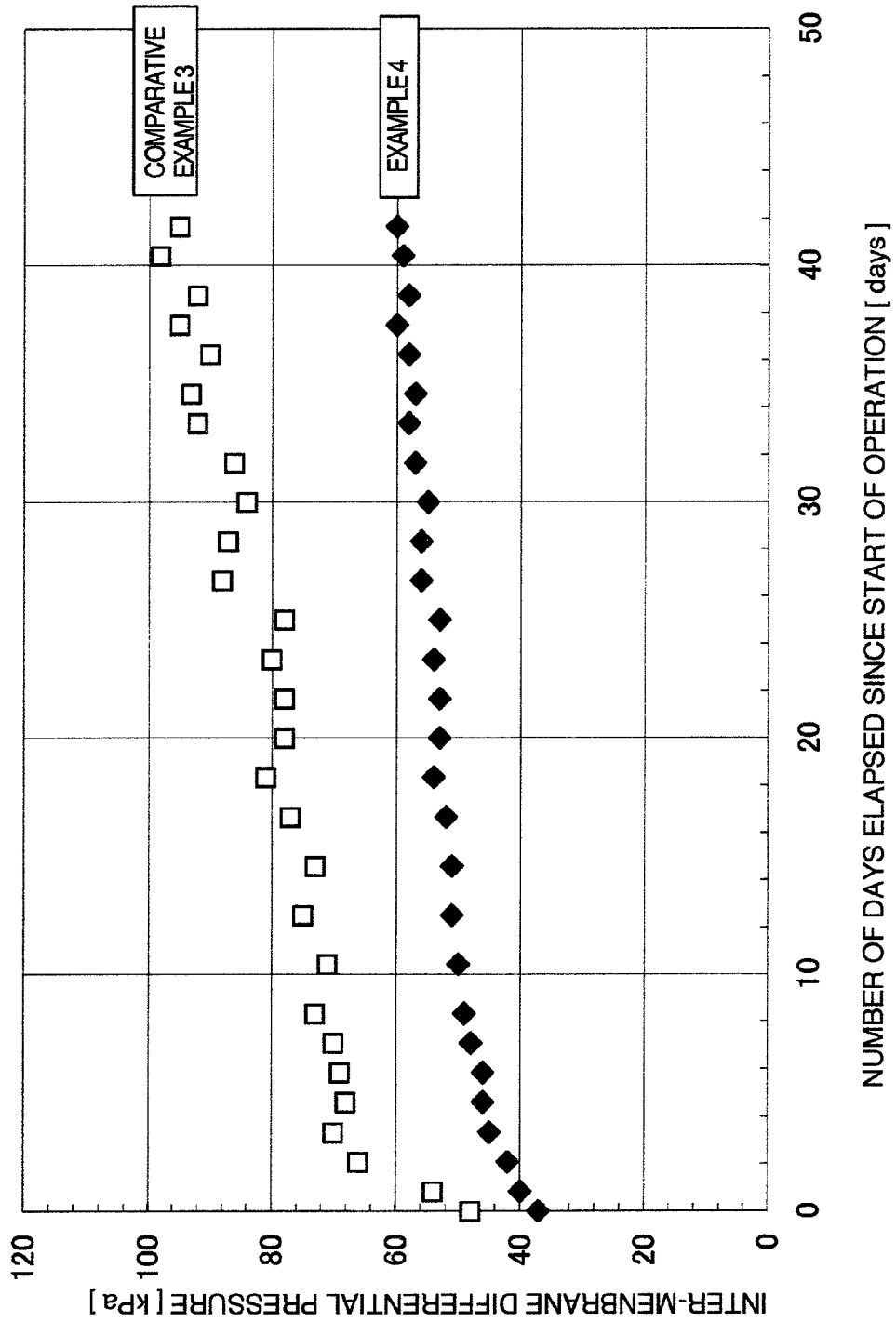
FIG. 19 is a graph showing the results of filtration stability tests in Experiment Example 4 and Comparative Example 3.
Figure 20:
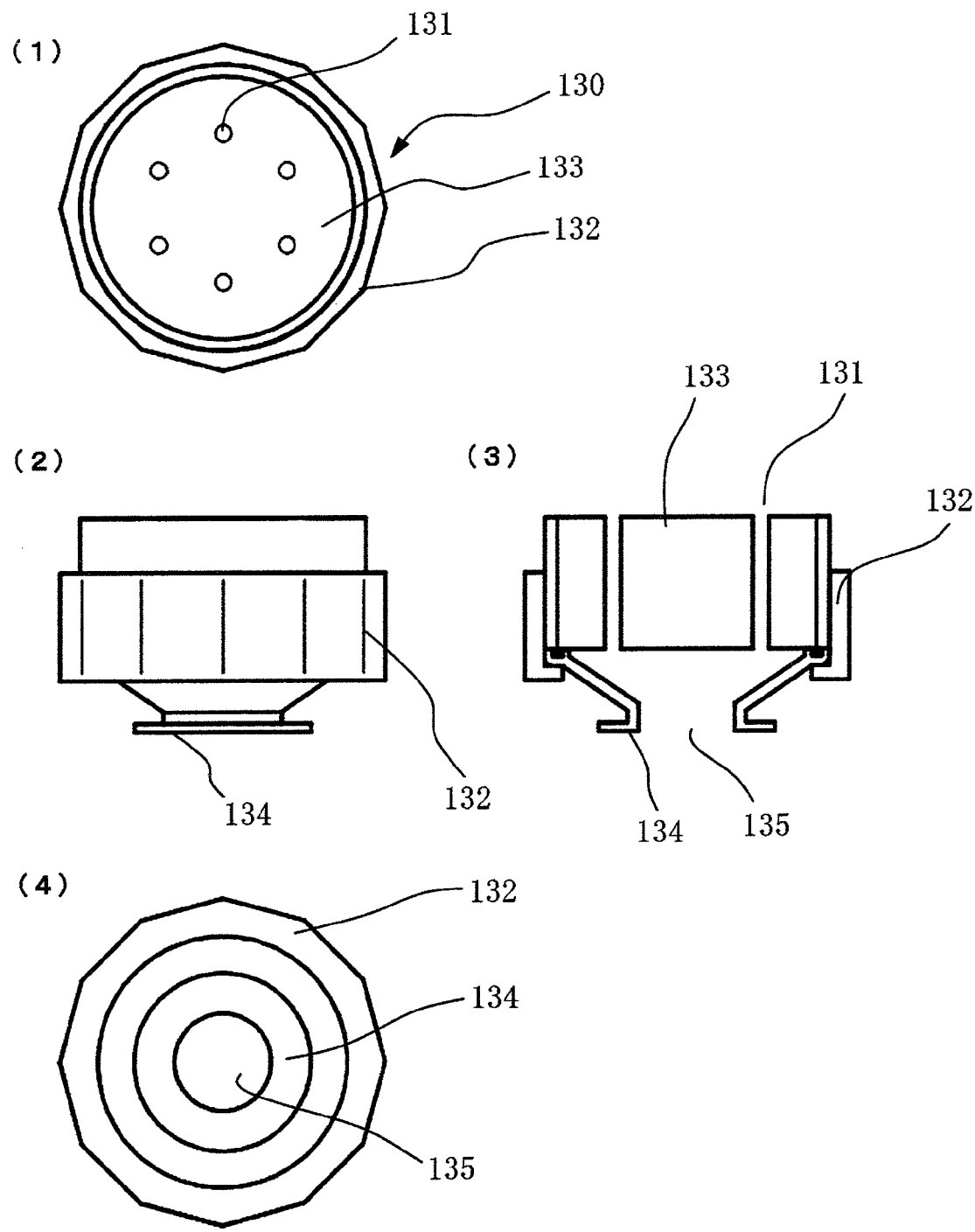
FIG. 20 is a schematic diagram of an element 130 used in Experiment Example 8.
Figure 21:
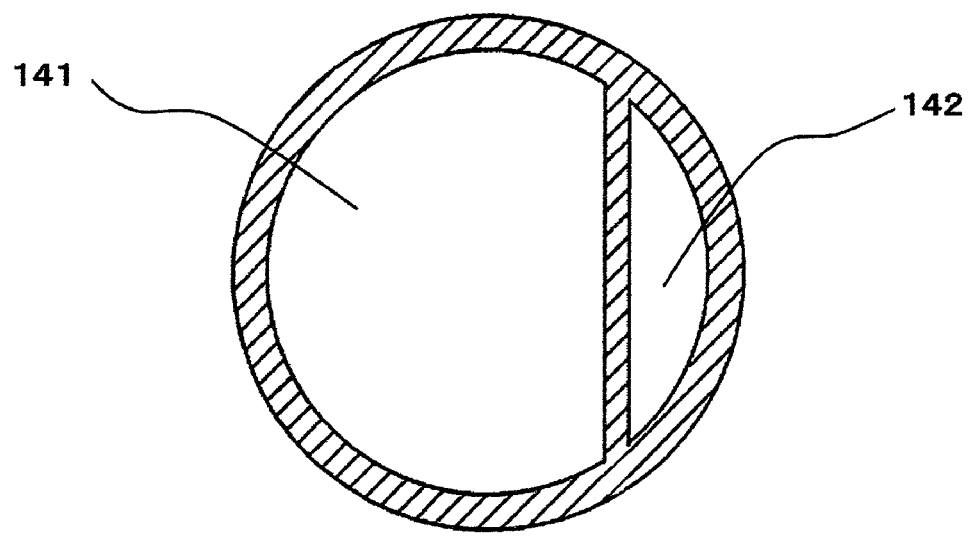
FIG. 21 is a sectional view showing an example of an irregular-shaped double pipe.
Figure 22:
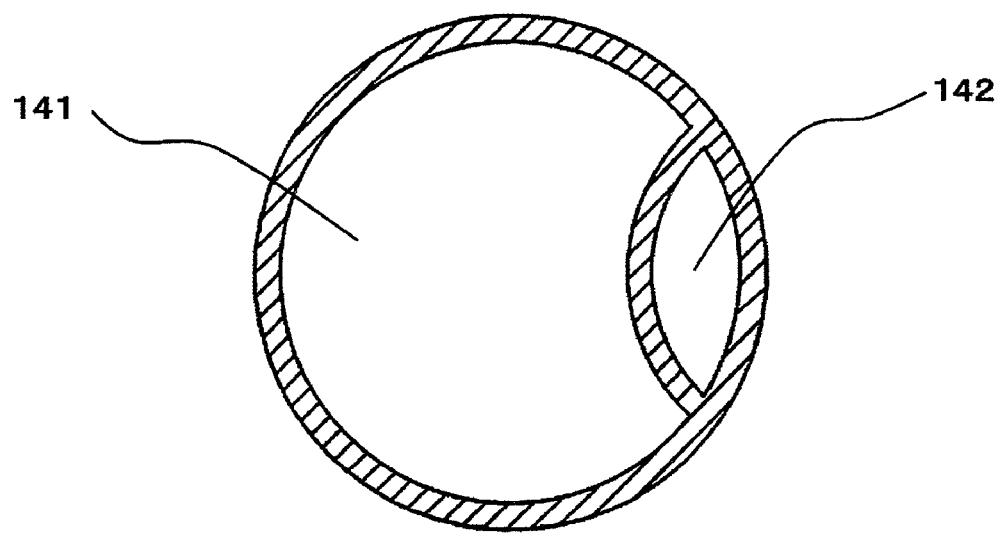
FIG. 22 is a sectional view showing an example of the irregular-shaped double pipe.
Figure 23:
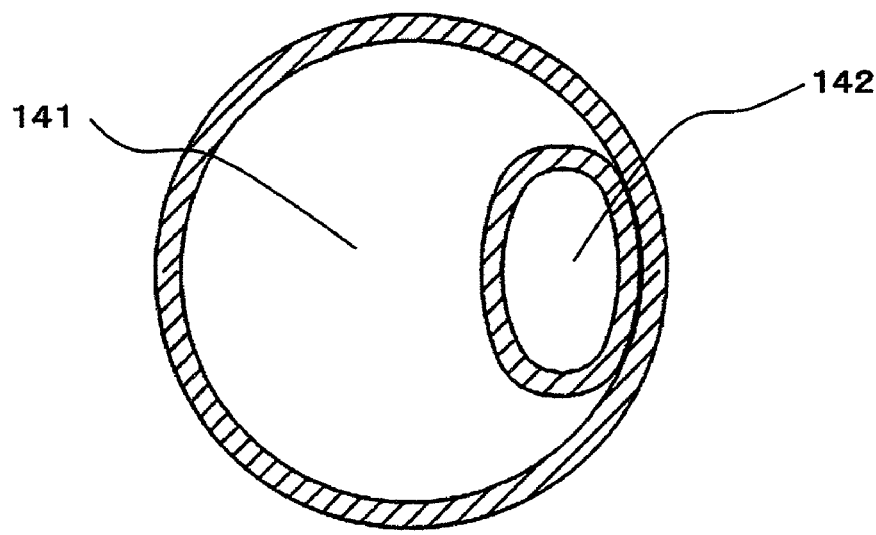
FIG. 23 is a sectional view showing an example of the irregular-shaped double pipe.
Figure 24:
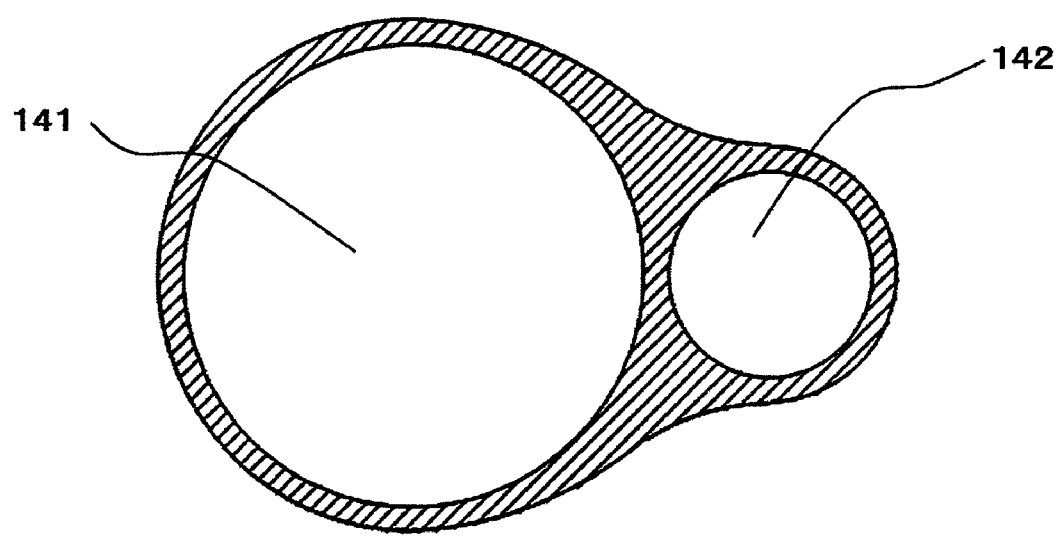
FIG. 24 is a sectional view showing an example of the irregular-shaped double pipe.
Figure 25:
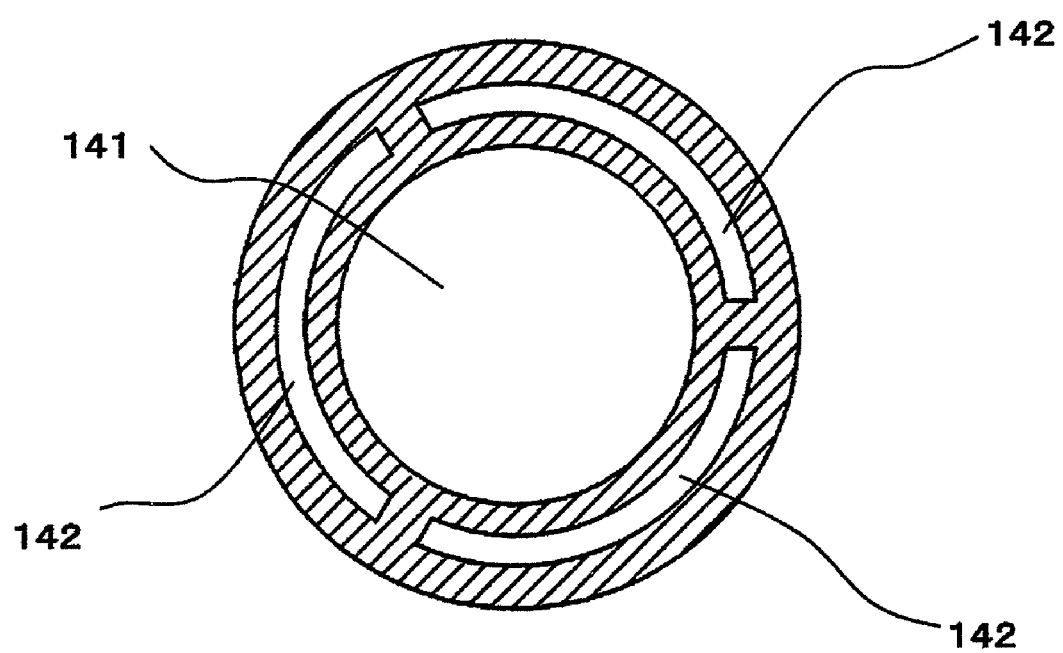
FIG. 25 is a sectional view showing an example of the irregular-shaped double pipe.
Figure 26:
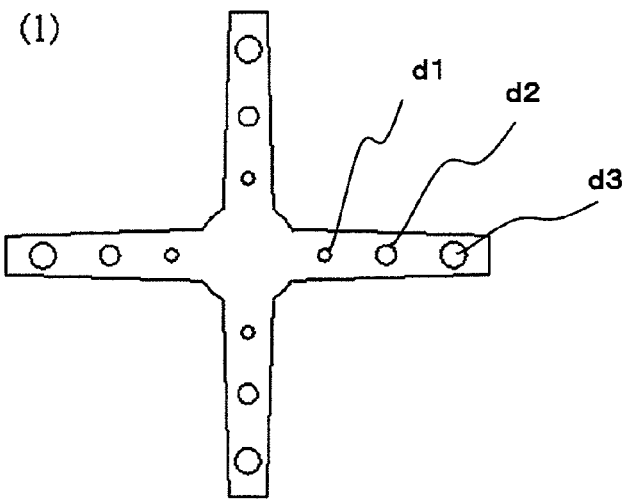
FIG. 26 is a schematic diagram illustrating how the inner sectional area of a raw-water supply branching portion is increased as well as raw-water introduction holes, wherein FIG. 26(1) is a top view, FIG. 26(2) is a front view, FIG. 26(3) is a sectional view taken along line J-J', and FIG. 26(4) is a sectional view taken along line K-K'.
Figure 26:
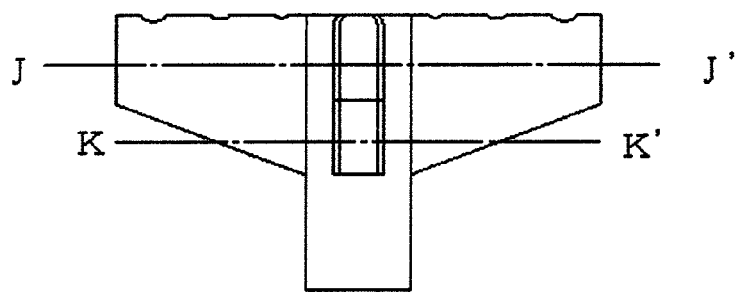
Figure 26:
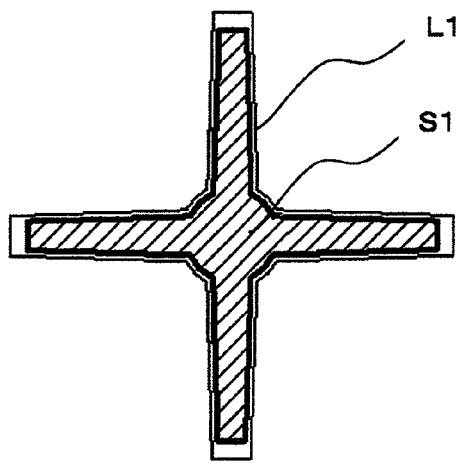
Figure 26:
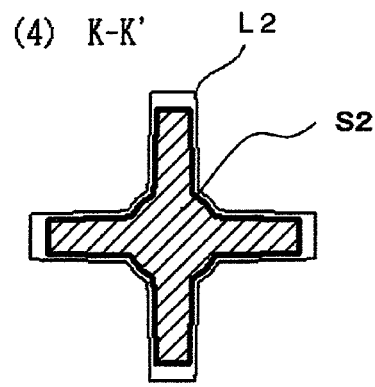

| DESCRIPTION OF REFERENCE NUMERALS | |
|---|---|
| 1 | Hollow fiber membrane module assembly |
| 10 | Second cap |
| 11 | Flange |
| 12 | Cup |
| 13 | Permeated water sampling port |
| 14 | Intra-cap space |
| 15 | O ring |
| 20 | Hollow fiber membrane module |
| 21 | Module case |
| 22 | Concentrated water or air discharge port |
| 23 | Intra-module space |
| 24 | Hollow fiber membrane |
| 25 | Communication pipe |
| 26 | (Upper) adhesive fixing portion |
| 27 | (Lower) adhesive fixing portion |
| 28 | Bonded end surface |
| 29 | Outer end surface |
| 30 | Tapered surface |
| 31, 31' | Inner end surface or top surface of hollow plate |
| 32, 32' | Raw-water introduction hole |
| 33 | Raw-water supply branching portion |
| 34 | Space serving as supply source pipe portion |
| 35 | Pipe portion |
| 36 | Bottom surface |
| 37, 38 | Hollow plates |
| 39 | Centering rib |
| 40 | Flange |
| 40' | Lower end |
| 41 | Cup |
| 42 | Projecting portion joined to supply source pipe portion |
| 43 | Raw-water supply port |
| 44 | Permeated water holding chamber |
| 45 | Ring portion |
| 46 | O ring groove |
| 48, 48' | Pipe |
| 50 | First cap |
| 51, 52 | Cap fastening jig |
| 60 | Plug part |
| 70 | Test part |
| 71 | End cap |
| 72 | Pipe |
| 73 | Circular hole |
| 74 | Tee |
| 80 | Element |
| 81 | Outer ring-like space |
| 82, 83 | Raw-water introduction plates |
| 84, 86 | Raw-water introduction passages |
| 85 | Adhesive fixing portion |
| 87 | Pipe portion |
| 88 | Raw-water supply port |
| 90 | Hollow object |
| 100 | Comparative module assembly |
| 101, 103 | Second caps |
| 102 | Comparative module |
| 104 | Module case |
| 105 | Hollow fiber membrane |
| 106, 107 | Adhesive fixing portions |
| 108 | Raw-water introduction hole |
| 110 | Raw-water supply port |
| 111 | Concentrated water or air discharge port |
| 112 | Permeated water sampling port |
| 120, 121 | Cap fastening jigs |
| 130 | Element |
| 131 | Raw-water introduction passage |
| 132 | Cap fastening jig |
| 133 | Adhesive fixing portion |
| 134 | Flange portion |
| 135 | Raw-water supply port |
| 141 | First portion in which hollow fiber membranes are placed |
| 142 | Second portion serving as permeated water communication portion |

The invention claimed is:

1. A hollow fiber membrane module, comprising:

a cylindrical module case;

a bundle of a large number of hollow fiber membranes housed in the module case;

adhesive fixing portions fixing respective opposite ends of the bundle in the module case so as to allow a raw fluid to pass through the hollow fiber membranes;

a permeated fluid communication portion connecting opposite outer end surfaces of the adhesive fixing portions together via a pipe with a larger equivalent diameter than each of the hollow fiber membranes; and a raw-fluid distributive supply portion located at one of the adhesive fixing portions to enable the raw fluid to be fed into the module case, wherein the raw-fluid distributive supply portion comprises a supply source pipe extending from a center of the outer end surface of the one of the adhesive fixing portions in a length direction of the module case and a plurality of raw-fluid supply branching portions in fluid communication with an outlet of the supply source pipe and branching from the supply source pipe so as to evenly distribute the supplied raw fluid in a direction of a cross section of the hollow fiber membrane module, the plurality of raw-fluid supply branching portions having a plurality of raw-fluid introduction holes provided in a gap between the hollow fiber membranes so as to enable the raw fluid to be fed along a longitudinal direction of the hollow fiber membranes, wherein at least a portion of both the supply source pipe and the plurality of raw-fluid supply branching portions of the raw-fluid distributive supply portion are positioned within the one of the adhesive fixing portions, wherein the plurality of raw-fluid supply branching portions following the supply source pipe are provided therein, each having an acute forward angle extending from the supply source pipe along the length direction.

2. The hollow fiber membrane module according to claim 1, wherein the raw-fluid distributive supply portion comprises raw-fluid introduction holes configured so as to follow the plurality of raw-fluid supply branching portions and extend to an inner end surface of the one of the adhesive fixing portions, and a sectional area of the plurality of raw-fluid supply branching portions increases along a forward flow direction of the raw fluid.

3. The hollow fiber membrane module according to claim 1, wherein the plurality of raw-fluid supply branching portions are plate-like voids substantially parallel to the length direction, and a plurality of raw-fluid supply branching portions are radially arranged in the raw-fluid distributive supply portion around the supply source pipe serving as a substantial center axis.

4. The hollow fiber membrane module according to claim 1, wherein the plurality of raw-fluid supply branching portions are 3 to 9 raw-fluid supply branching portions branching from the supply source pipe.

5. The hollow fiber membrane module according to claim 1, wherein a plurality of the raw-fluid introduction holes are provided in each of the plurality of raw-fluid supply branching portions, and a sum of equivalent diameters of the plurality of raw-fluid introduction holes is smaller than a maximum equivalent diameter of the plurality of raw-fluid supply branching portions.

6. The hollow fiber membrane module according claim 1, wherein when each of the plurality of raw-fluid supply branching portions is divided into a central side and an outer side at a position of a half radius outward from the center of the plurality of raw-fluid supply branching portions, the sum of the equivalent diameters of the raw-fluid introduction holes in the outer-side division is larger than the sum of the equivalent diameters of the raw-fluid introduction holes in the central-side division.

7. The hollow fiber membrane module according to claim 1, wherein the plurality of raw-fluid introduction holes are provided at equal intervals.

8. The hollow fiber membrane module according to claim 1, wherein the equivalent diameter of each of the raw-fluid introduction holes increases with decreasing distance to an outer circumference of the module case.

9. The hollow fiber membrane module according to claim 1, wherein the permeated fluid communication portion is at least one communication pipe contained in the hollow fiber membrane bundle.

10. The hollow fiber membrane module according to claim 9, wherein a number of the communication pipes is one to four.

11. The hollow fiber membrane module according to claim 1, wherein the module case is an irregular-shaped double pipe comprising a first portion having a relatively large inner sectional area and a second portion having a relatively small inner sectional area, and the hollow fiber membrane bundle is housed in the first portion, whereas the permeated fluid communication portion is provided in the second portion.

12. The hollow fiber membrane module according to claim 1, wherein the inner end surface of the raw-fluid distributive supply portion is substantially flush with an inner end surface of an adhesive that provides the one of the adhesive fixing portions.

13. A process for manufacturing the hollow fiber membrane module according to claim 12, comprising molding at least a part of a raw-fluid distributive supply portion using a material which is easily dissolved into, or easily absorbed and dispersed in water, hot water, or an organic solvent not affecting a member comprising a hollow fiber membrane module, placing an inner end surface of the molded raw-fluid distributive supply portion inside the adhesive fixing portion, then adhesively fixing the raw-fluid distributive supply portion, a hollow fiber membrane, a permeated fluid communication portion, and a module case together, and then allowing at least a part of the raw-fluid distributive supply portion to be dissolved into or absorbed and dispersed in any of the water, the hot water, and the organic solvent to form the raw-fluid distributive supply portion.

14. A hollow fiber membrane module assembly comprising a first cup (i) shaped like a cup comprising a raw-fluid supply port and (ii) having a permeated fluid holding space inside the cup shape, the first cup being fixed to an outside of an outer end surface of an adhesive fixing portion at a circumferential end side of the cup shape in a liquid-tight manner, the adhesive fixing portion including the raw-fluid distributive supply portion of the hollow fiber membrane module according to claim 1, and a second cup (a) shaped like a cup comprising a permeated fluid sampling port and (b) having a permeated fluid holding space inside the cup shape, the second cup being fixed to an outside of an outer end surface of another adhesive fixing portion at a circumferential end side of the cup shape in a liquid-tight manner, iii) the first cup comprising a nozzle extending continuously from the raw-fluid supply port in a liquid-tight manner and projecting into the permeated fluid holding space, and iv) the nozzle being coupled to the supply source pipe in a liquid-tight manner.

15. A method of purifying suspended water wherein a raw fluid is water and a product of a turbidity of the water and TOC (Total Organic Carbon) is 10,000 degrees×mg/liter or less and wherein water with a turbidity of 100 degrees or less and a TOC of 100 mg/liter or less and the hollow fiber membrane module according to claim 1 is used to obtain filtrate.

16. A hollow element forming a raw-fluid distributive supply portion comprising
 a supply source pipe for supplying raw water, compressed air, or a mixed flow of raw water and compressed air;
 a plurality of raw-fluid supply branching portions for evenly distributing the supplied raw water, the supplied compressed air or the supplied mixed flow of raw water and compressed air; and
 a plurality of raw-fluid introduction holes introducing the distributed raw water, the distributed compressed air or the distributed mixed flow of raw water and compressed air;
 wherein the plurality of raw-fluid supply branching portions are connected to the supply source pipe, each having an acute forward angle extending from the supply source pipe along a length direction of the supply source pipe.

17. The hollow element according to claim 16, wherein a cross-sectional area of the plurality of raw-fluid supply branching portions increases along a forward flow direction of the raw water, the compressed air, or the mixed flow of raw water and compressed air.

18. The hollow element according to claim 16, wherein the plurality of raw-fluid supply branching portions are plate-like voids substantially parallel to the length direction, and the plurality of raw-fluid supply branching portions are radially arranged in the raw-fluid distributive supply portion around the supply source pipe portion serving as a substantial center axis.

19. The hollow element according to claim 16, wherein the plurality of raw-fluid supply branching portions are 3 to 9 raw-fluid supply branching portions branching from the supply source pipe portion.

20. The hollow element according to claim 16, wherein the plurality of raw-fluid introduction holes are formed in each of the plurality of raw fluid supply branching portions, and a sum of equivalent diameters of the plurality of raw-fluid introduction holes is smaller than a maximum equivalent diameter of the plurality of raw-fluid supply branching portions.

21. The hollow element according to claim 16, wherein when each of the plurality of raw-fluid supply branching portions is divided into a central side and an outer side at a position of a half radius outward from the center of the plurality of raw-fluid supply branching portions, the sum of the equivalent diameters of the plurality of raw-fluid introduction holes in the outer-side division is larger than the sum of the equivalent diameters of the plurality of raw-fluid introduction holes in the central-side division.

22. The hollow element according to claim 16, wherein the plurality of raw-fluid introduction holes are positioned at equal intervals.

23. A hollow fiber membrane module comprising the hollow element according to claim 16.

* * * * *